United States Patent
Varadhan et al.

(10) Patent No.: US 8,307,422 B2
(45) Date of Patent: *Nov. 6, 2012

(54) ROUTING DEVICE HAVING INTEGRATED MPLS-AWARE FIREWALL

(75) Inventors: Kannan Varadhan, San Jose, CA (US); Joao Campelo F. N. Gomes, Bristol (GB)

(73) Assignee: Juniper Networks, Inc., Sunnyvale, CA (US)

(*) Notice: Subject to any disclaimer, the term of this patent is extended or adjusted under 35 U.S.C. 154(b) by 932 days.

This patent is subject to a terminal disclaimer.

(21) Appl. No.: 12/271,605

(22) Filed: Nov. 14, 2008

(65) Prior Publication Data

US 2010/0043068 A1 Feb. 18, 2010

Related U.S. Application Data

(60) Provisional application No. 61/088,916, filed on Aug. 14, 2008.

(51) Int. Cl.
G06F 15/16 (2006.01)
(52) U.S. Cl. ............... 726/15; 726/22; 713/151
(58) Field of Classification Search ............... None
See application file for complete search history.

(56) References Cited

U.S. PATENT DOCUMENTS

| | | | |
|---|---|---|---|
| 7,860,999 B1 | 12/2010 | Subramanian et al. | |
| 2002/0080720 A1 | 6/2002 | Pegrum et al. | |
| 2003/0065944 A1* | 4/2003 | Mao et al. | 713/201 |
| 2004/0044761 A1 | 3/2004 | Phillipi et al. | |
| 2004/0174879 A1 | 9/2004 | Basso et al. | |
| 2005/0080901 A1 | 4/2005 | Reader | |
| 2005/0114656 A1 | 5/2005 | Liu et al. | |
| 2006/0056297 A1 | 3/2006 | Bryson et al. | |
| 2007/0022479 A1 | 1/2007 | Sikdar et al. | |
| 2007/0133530 A1 | 6/2007 | Previdi et al. | |
| 2007/0209058 A1* | 9/2007 | Anantharamiah et al. | 726/1 |
| 2009/0182843 A1 | 7/2009 | Hluchyj et al. | |

OTHER PUBLICATIONS

Cameron et al. Configuring Juniper Networks Netscreen and SSG Firewalls, Feb. 2007 pp. 1-90.*
Office Action from U.S. Appl. No. 12/271,585, dated Aug. 16, 2011, 22 pp.
Response to Office Action dated Aug. 16, 2011, from U.S. Appl. No. 12/271,585, filed Nov. 16, 2011, 14 pp.
Extended European Search Report for Application No. 09167142,0, dated Nov. 11, 2009 (7 pgs.).

(Continued)

Primary Examiner — Shewaye Gelagay
(74) Attorney, Agent, or Firm — Shumaker & Sieffert, P.A.

(57) ABSTRACT

An MPLS-aware firewall allows firewall security policies to be applied to MPLS traffic. The firewall, which may be integrated within a routing device, can be configured into multiple virtual security systems. The routing device provides a user interface by which a user specifies one or more zones to be recognized by the integrated firewall when applying stateful firewall services to the packets. The user interface allows the user to define different zones and policies for different ones of the virtual security systems. In addition, the user interface supports a syntax that allows the user to define the zones for the firewall by specifying the customer VPNs as interfaces associated with the zones. The routing device generates mapping information for the integrated firewall to map the customer VPNs to specific MPLS labels for the MPLS tunnels carrying the customer's traffic.

21 Claims, 12 Drawing Sheets

OTHER PUBLICATIONS

"Method and System of MPLS based Firewall/Access Control," IP.com Journal, Technical Disclosure, IBM, May 30, 2008 (3 pgs.).

Cameron et al., "Configuring Juniper Networks NetSoreen & SSG Firewalls," REFEREX, Feb. 2007, 90 pgs.

Fang et al., "Security Framework for Provider-Provisioned Virtual Private Networks (PPVPNs), rfc4111.txt," IETF Standard, Internet Engineering Task Force, Jul. 1, 2005, 46 pgs.

U.S. Appl. No. 12/271,585, entitled "Routing Device Having Integrated MPLS-Aware Firewall With Virtual Security System Support", filed Nov. 14, 2008.

U.S. Appl. No. 12/182,619, entitled "Streamlined Packet Forwarding Using Dynamic Filters for Routing and Security in a Shared Forwarding Plane," filed Jul. 30, 2008.

U.S. Appl. No. 11/832,342, entitled "Multi-Chassis Router With Multiplexed Optical Interconnects," filed Aug. 1, 2007.

Wheeler, Don, "Virtualization Technologies Overview, Juniper Networks NetScreen Integrated Firewall and VPN Security Devices", Mar. 2005, 10 pages.

Netscreen Technologies, Inc. "NetScreen New Features Guide", ScreenOS 4.0.1, Rev.B, P/N 093-0754-000, 2003, 108 pages.

Juniper Networks, Inc., "Concepts and Examples ScreenOS Reference Guide", vol. 10, Release 5.4.0, Rev B, P/N 530-015777-01, Copyright 2006, 84 pages.

First Office Action for corresponding Chinese Patent Application No. 200910166159.X, mailed Jul. 1, 2011, 7 pp.

Response to Office Action dated Dec. 21, 2012, from U.S. Appl. No. 12/432,366, filed Mar. 21, 2012, 15 pp.

Response to Office Action dated Jan. 12, 2012, from U.S. Appl. No. 12/271,585, filed Mar. 30, 2012, 6 pp.

Notice of Allowance from U.S. Appl. No. 12/271,585, dated Apr. 9, 2012, 19 pp.

CPNI, "Engress and Ingress Filtering," Centre for the Protection of National Infrastructure, Apr. 20, 2006, Retrieved on May 16, 2012, Online: http://www.cpni.gov/Documents/Publications/2006/2006004-TN0106_Egress_ingress.pdf.

Cisco, "User Guide for Cisco Security Manager 3.0.2" 2007, Cisco Systems, Chapter 16, pp. 16-1 to 16-46.

Fortinet, "FortiOsCarrier CLI Reference Version 3.0 MR4," Fortinet, Inc. Mar. 11, 2008 pp. 15-16, 102.

Office Action from U.S. Appl. No. 12/432,366, dated May 25, 2012, 22 pp.

Cisco, "User Guide for Cisco Security Manager 3.0.2," 2007, Cisco Systems, Inc., Ch. 1, pp. 1-14.

Bachert, "IPv4 Multicast Security: A Network Perspective," 2002, SANS Institute InfoSec Reading Room, 15 pp.

Cisco Systems, Inc., Feature Information for Zone-Based Policy Firewall, Jun. 2006, 46 pp.

Office Action from U.S. Appl. No. 12/432,366, dated Dec. 21, 2011, 20 pp.

Office Action from U.S. Appl. No. 12/271,585, dated Jan. 12, 2012, 25 pp.

* cited by examiner

ROUTING DEVICE HAVING INTEGRATED MPLS-AWARE FIREWALL

This application claims the benefit of U.S. Provisional Application No. 61/088,916, filed Aug. 14, 2008, entitled "ROUTING DEVICE HAVING INTEGRATED MPLS-AWARE FIREWALL," the entire content of which is incorporated herein by reference.

TECHNICAL FIELD

The invention relates to computer networks and, more specifically, network devices that route packets within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

A private network may include a number of devices, such as computers, owned or administered by a single enterprise. These devices may be grouped into a number of site networks, and these sites in turn may be geographically distributed over a wide area. Each site network may include one or more local area networks (LANs) connecting the devices at the particular site.

With the advent of Virtual Private Network (VPN) technology, enterprises can now securely share data between site networks over a public network, such as the Internet. For example, a hub or central VPN site may be the network at the headquarters of the enterprise, while spoke site networks are typically networks at geographically distributed branch offices, sales offices, manufacturing or distribution facilities, or other remote site of the enterprise.

In some instances the remote sites may establish VPN tunnels to hub site or between the remote sites to allow the computing devices within the remote sites to securely communicate with each other or with devices at the hub site through the Internet or another public network infrastructure of a network service provider. A number of communication protocols have been developed for establishing a VPN tunnel. In general, these protocols allow network devices to establish the VPN tunnel as one or more secure data flows across the public network infrastructure. For example, Internet Protocol Security (IPSec) protocols and Secure Sockets Layer (SSL) protocols make use of cryptographic technology to establish network "tunnels." These tunnels allow packets conforming to other network protocols, such as Internet Protocol (IP) packets, to be encapsulated within encrypted packet streams flowing between the sites.

Commonly, each customer site may include a customer edge router that is coupled via a network link to a corresponding provider edge router within the service provider network. The provider edge routers provide VPN services so that the customer's traffic is securely communicated between the VPN sites through the service provider's network and possibly other intermediate networks. One common form of VPN services provided by the network service provider is a multi-protocol label switching (MPLS) VPN. Specifically, an MPLS VPN utilizes creates label switched paths (LSPs) for carrying the customer's VPN traffic through the intermediate networks via defined paths. That is, the routers of the service provider's network support MPLS and establish LSPs between the customer's sites for carrying the customer's VPN traffic.

Due to increasing importance of network security, it has become common for service providers to deploy security devices at the border between each VPN site and the service provider network or other intermediate public networks connecting the VPN sites. One example of a commonly deployed security device is a firewall network device. A firewall, for example, is typically a dedicated device that is configured to permit or deny traffic flows based on the service provider's security policies.

Conventional firewalls, however, have difficulty applying security services to MPLS traffic for various reasons. For example, MPLS traffic flowing through a firewall typically has no state in the data plane. That is, MPLS traffic consists of MPLS labels attached to encapsulated traffic, such as IP traffic. When passing through the firewall, the MPLS labels attached to MPLS packets typically have no meaning to the firewall. As such, the firewall device is unable to provide stateful analysis of the MPLS traffic, such as application of deep packet inspection using assembled application layer data.

For this reason, service providers commonly deploy a separate firewall device between each customer edge router and the corresponding provider edge router that provides ingress and egress for the MPLS tunnels. In this way, the firewall devices are located entirely outside of the MPLS core of the service provider network and are able to apply firewall policies to Internet-Protocol (IP)-based traffic from each customer site external to the MPLS core. However, deployment of these firewall devices increases the number of devices that the service provider must manage and deploy. This increases the configuration and management burden on the service provider, as well as creates power, thermal, cooling, rack space and other issues for the administrator.

SUMMARY

In general, an MPLS-aware firewall is described that allows firewall security policies to be applied to MPLS traffic. Moreover, the MPLS-aware firewall may be integrated within a routing device, thus allowing a single device to provide both routing functionality, including MPLS support, as well as firewall services. As one example, a service provider may deploy a single device as described herein to provide MPLS VPN services to customers as well as apply firewall policies to the customer's MPLS VPN traffic. In this manner, the techniques described herein may allow the service providers to avoid the requirement to deploy separate routers and non-MPLS aware firewalls when providing MPLS VPN services.

Further, the techniques described herein may be applied to achieve zone-based firewall services that allow zone-based security policies to be defined and applied for the different network interfaces of the firewall. For example, in addition to allowing zones to be defined based on physical interfaces, the device described herein allows security zones to be defined for VPN tunnels carrying communications for customer VPNs. That is, the device provides a user interface by which VPN tunnels can be defined as logical interfaces for purposes of security policies, and these logical interfaces can be used like other physical interfaces to define zones to which policies are to be applied by the device.

In one embodiment, the invention is directed to a network router comprising a plurality of interfaces configured to send and receive packets, and a routing engine having a control unit that executes a routing protocol to maintain routing information specifying routes through a network, wherein the control unit executes at least one protocol to establish VPN tunnels for one or more customer VPNs. The network router further includes a forwarding engine configured by the routing engine to select next hops for the packets in accordance with the routing information, the forwarding plane having a switch fabric to forward the packets to the interfaces based on the selected next hops. The network router also includes a firewall integrated within the network router, the firewall configured to apply security functions to the packets. Upon receiving packets from the network, a flow control module of the forwarding engine directs one or more of the packets to the integrated firewall for application of the stateful firewall services. Further, the network router provides a user interface by which a user specifies one or more zones to be recognized by the firewall when applying the stateful firewall services to the packets. The example user interface supports a text-based syntax that allows the user to define the zones by specifying the customer VPNs as interfaces associated with the zones. In other examples, a graphical user interface may readily be used. Moreover, the user interface may be remotely accessed or deployed by a web browser, a management and provisioning system, or other device.

In another embodiment, a method includes executing, with a routing engine of a router, at least one protocol to establish virtual private (VPN) tunnels for customer VPNs. The method further includes presenting, with the network router, a user interface by which a user specifies one or more zones to be recognized by a firewall integrated within the router, wherein the user interface supports a syntax that allows the user to define the zones by specifying one or more of the VPN tunnels for the customer VPNs as interfaces associated with the zones. The method further includes receiving, from a network, packets at a plurality of interfaces of the router; directing, with a flow control module of a forwarding engine of the router, one or more of the received packets to the firewall for application of stateful firewall services; and applying stateful firewall services to the packets with the firewall of the network router based on the zones specified by the user. Further, the method includes, after applying stateful firewall services, forwarding at least some of the packets from the firewall to the forwarding engine; selecting next hops for the packets within the network with the forwarding engine; and forwarding the packets to the interfaces in accordance with the selected next hops.

The integrated router and MPLS-aware firewall described herein may have certain advantages over conventional firewalls. For example, device is able to provide firewall services that require deep packet inspection using assembled application layer data even though the VPN traffic may be encapsulated with one or more labels and, thus, typically has no state in the data plane. For example, the integrated router and MPLS-aware firewall can apply intrusion detection and prevention, virus scanning, layer seven application layer security services and other services that require stateful analysis of the MPLS traffic carried over a VPN.

Moreover, the integrated router and MPLS-aware firewall may have certain advantages when deployed at the edge of a service provider network that provides MPLS-based VPN services. For example, in this situation the MPLS-aware firewall is able to apply firewall services even though it operates on asymmetric traffic, i.e., IP traffic and MPLS traffic, at the interface to and from the MPLS VPN core provided by the service provider network. Further, the device the integrated router and MPLS-aware firewall can easily service multiple customers of the service provider network.

In addition, the MPLS-aware firewall may support virtual security systems. That is, the firewall may be logically partitioned into multiple virtual security systems to provide multi-tenant security services. The virtual security systems represent logically partitioned firewall instances providing separate security services, including MPLS-aware zone-based firewall services. The router may present the virtual security systems as logically independent firewalls that can be independently configured even though the virtual security systems may share computing resources of the integrated firewall. The router presents a user interface that allows a root system administrator or an administrator authorized for a specific virtual security system to define different zones and policies for different ones of the virtual security systems.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
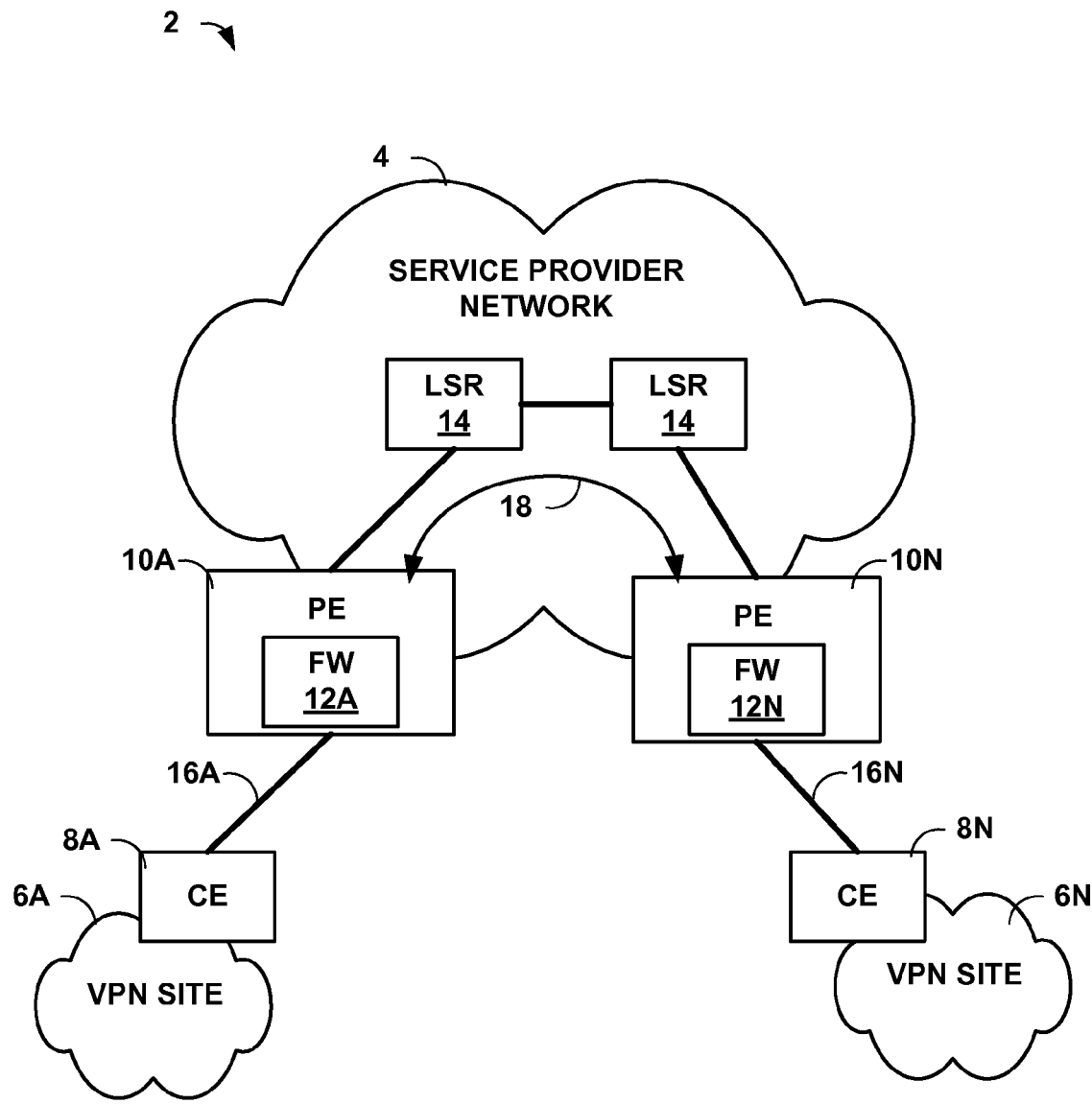
FIG. 1 is a block diagram illustrating an example network environment in which a router includes an integrated MPLS-aware firewall.

FIG. 1 is a block diagram illustrating an example network environment 2 in which a service provider network 4 provides connectivity between customer virtual private network (VPN) sites 6A-6N (collectively, VPN sites 6). In the example of FIG. 1, VPN sites 6 includes customer edge (CE) routers 8A-8N connected to provider edge (PE) routers 10A-10N of service provider network 4 via network links 16A-16N.

In one example, service provider network 4 supports provider-provisioned VPNs (PPVPNs). PE routers 10A-10N (collectively, PE routers 10) transport communications of customer VPN sites 6 through service provider network 4 and possibly other intermediate networks. Service provider network generally includes a set of PE routers 10 at the edge of the network interconnected with internal routers and other network devices via high-speed network links. As shown in FIG. 1, the internal routers may be label switched routers (LSRs) 14 that provide a Multi-protocol Label Switching (MPLS) MPLS core network. PE routers 10 and LSRs 14 execute one or more routing protocols, such as Intermediate System to Intermediate System (ISIS) for distributing routing information. In addition, PE routers 10 may execute the Multi-Protocol Border Gateway Protocol (mpBGP) for exchanging VPN routes associated with VPN sites 6 as well as VPN labels to be applied to the VPN communications. For example, administrators associated with service provider network 4 may configure PE routers 10 so as to provision VPN services for one or more customer VPNs. At this time the administrators define a VPN identifier for each customer VPN (e.g., VPN_CUSTOMER_A), and PE routers 10 allocate VPN labels, VPN addresses, a router target, a router distinguisher, and all other state information necessary for the VPN. In the example of FIG. 1, PE routers 10 exchange this information via mpBGP so as to form one or more end-to-end VPN tunnels 18.

In addition, PE routers 10 may communicate with LSRs 14 to establish one or more MPLS tunnels in the form of one or more end-to-end label switch paths (LSPs) for transporting the VPN communications through service provider network 4 and possibly other intermediate networks. Traffic flowing along network links 16 to and from VPN sites 6 may take the form of Internet Protocol (IP) packets, and may be secured using Internet Protocol Security (IPSec) protocols, Secure Sockets Layer (SSL) protocols or other protocols that make use of cryptographic technology. PE routers 10 provide ingress and egress for the IP traffic with respect to the Multi-protocol Label Switching (MPLS) services provided within service provider network 4. That is, PE routers 10 operate as ingress and egress LSRs for communicating the IP packets of VPN sites 6 as encapsulated VPN packets traversing VPN tunnels 18 and optionally one or more LSPs. For example, PE router 10A may receive IP traffic from VPN site 6A, and may then prepend a VPN label based on the corresponding customer VPN associated with the traffic. The VPN traffic may then be viewed as flowing along a VPN tunnel through service provider network 4, and the VPN tunnel 18 may be viewed as a form of an MPLS tunnel. One or more of these VPN tunnels 18 (i.e., packet flows having VPN labels prepended to each packet) may then further be encapsulated within a label stack of additional MPLS labels so as to flow along one or more LSPs. For example, PE router 10A may further prepend one or more MPLS labels to form an outer label stack on top of the VPN label of each VPN packet, and forward the VPN packets along one or more dedicated LSPs through service provider network 4. PE routers 10 and LSRs 14 may use any type of label switching protocol to establish the LSPs, such as MPLS protocols like Resource Reservation Protocol (RSVP) and the Label Distribution Protocol (LDP).

As shown in FIG. 1, each of PE routers 10 includes an integrated firewall (FW) 12A-12N (collectively, FWs 12). As described in further detail below, each of FWs 12 is an MPLS-aware firewall that allows service provider network 4 to apply firewall security policies at the IP-MPLS interface. That is, FWs 12 allow firewall security policies to be applied at the point where IP traffic enters or exits VPN tunnels 18. Moreover, as illustrated in FIG. 1, the MPLS-aware FWs 12 may be integrated within routing device (e.g., PE routers 12), thus allowing a single device to provide both routing functionality, including MPLS support, as well as firewall services. In this manner, the techniques described herein may allow the service provider to avoid the requirement to deploy separate non-MPLS aware firewalls between PE routers 10 and CE routers 8.

Further, FWs 12 of PE routers 10 may provide zone-based firewall services that allow zone-based security policies to be defined and applied for the different network interfaces of the PE router. For example, in addition to allowing zones to be defined based on physical interfaces, the PE routers 10 provide a user interface that allows the service provider to define security zones with respect to customer VPNs that are supported by service provider network 4. That is, each of PE routers 10 may provide a user interface having a command syntax that allows individual customer VPNs to be defined and recognized by FWs 12 as logical interfaces, and these logical interfaces can be used like other physical interfaces of the PE routers to define zones and corresponding security polices to be applied to those zones.

Figure 2:
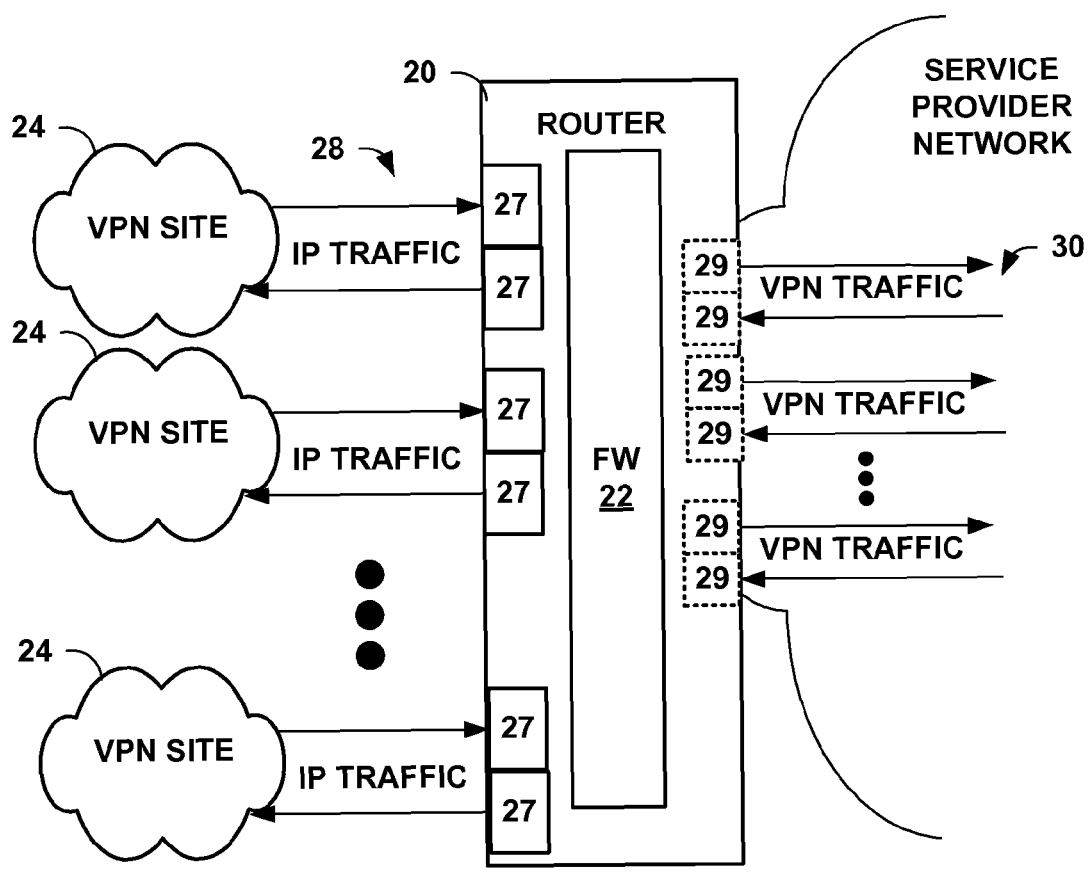
FIG. 2 is a block diagram illustrating in further detail an example router that includes an integrated MPLS-aware firewall.

FIG. 2 is a block diagram illustrating an example of an MPLS-enabled router, such as PE routers 10 of FIG. 1, that includes an integrated MPLS-aware firewall (FW) 22. In this example, FW 22 provides zone-based firewall services that allow zone-based security policies to be defined and applied for the different network interfaces of the router. In the example of FIG. 2, router 20 includes physical interfaces 27 for sending and receiving IP traffic 28 to and from VPN sites 24 via physical network links. Router 20 provides a user interface that allows the service provider to define zones and corresponding security policies with respect to those physical interfaces. In addition, the user interface of router 20 allows the service provider to define security zones with respect to individual customer VPNs 30 that are used to securely tunnel communications through the service provider network. For example, as shown in FIG. 2, the system administrator may interact with the user interface to specify logical interfaces 29 or other identifiers for one or more of the established customer VPNs. In addition, the user interface supports a command syntax that allows the logical interfaces for the individual customer VPNs 30 to be used in conjunction with the physical interfaces 27 of router 20 to define zones and corresponding security polices to be applied by FW 22 to those zones. As explained herein, router 20 maintains mapping information to allow router 20 to apply zone-based security services to customer traffic associated with VPN labels and optionally additional MPLS labels, thereby providing a router having integrated MPLS-aware firewall.

Figure 3:
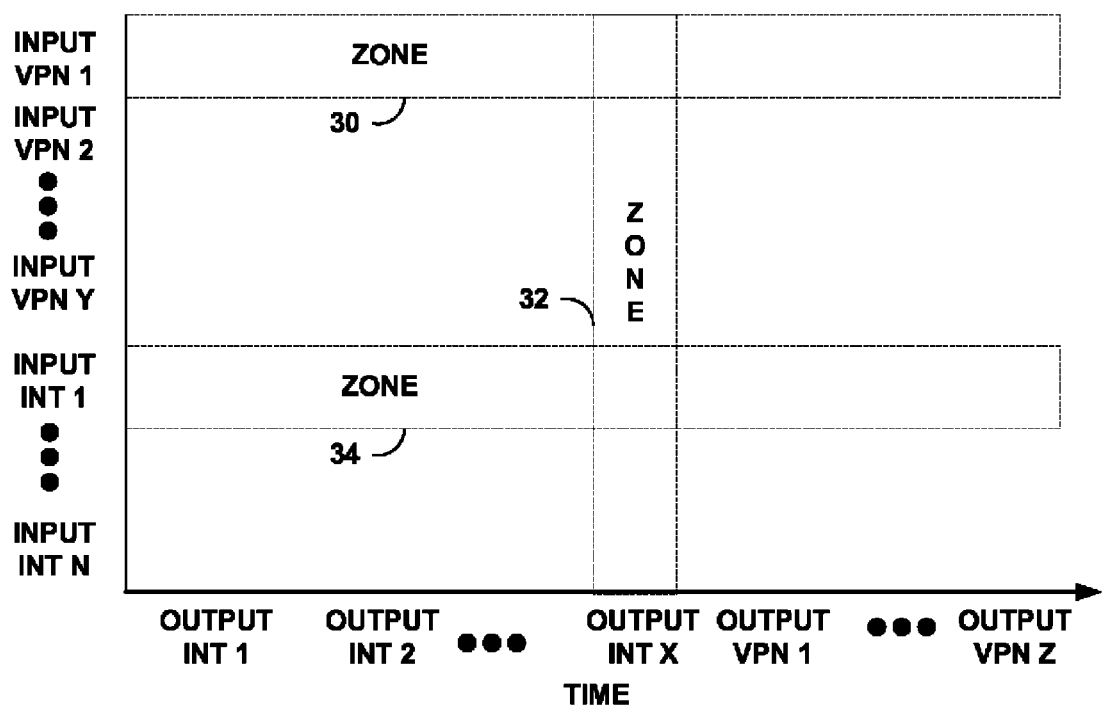
FIG. 3 is a chart illustrating an example configuration of a router having an integrated MPLS-aware firewall for providing zone-based firewall services to MPLS and other network traffic.

FIG. 3 is a chart illustrating an example configuration of FW 22 of router 20 for providing zone-based firewall services. In the chart of FIG. 3, the vertical axis represents all of the input interfaces of router 20, including N physical input interfaces (any of interfaces 27 of FIG. 2 for input links) as well as Y input VPNs (any of logical interfaces 29 for VPNs of which router 20 is the egress). The horizontal axis represents all of the output interfaces of router 20, including X physical output interfaces (any of interfaces 27 of FIG. 2 for output links) as well as Z output VPNs (any of logical interfaces 29 for VPNs of which router 20 is the ingress). In this example, a system administrator for the service provider network has interacted with the user interface of router 20 to define three distinct zones: (1) a first zone 30 for all MPLS traffic received via VPN 1, (2) a second zone 34 for all IP traffic output on physical interface OUTPUT INT X, and (3) a third zone 34 for all IP traffic received on physical interface INPUT INT 1.

Router 20 may, for example, provide a text-based command line interface by which the system administer or software agent provides configuration data in conformance with a command syntax as follows:

```
zone ZONE_NAME {
interface INTEFACE_NAME;
    ...
interface INTEFACE_NAME;
vpn VPN_NAME;
    ...
vpn VPN_NAME;
}
```

In the above example, the keyword "zone" indicates that the administrator is defining a new security zone, and the bracket delimiters enclose a collection of interfaces that define that zone. For example, any physical interfaces that fall within that zone can be specified using the keyword "interface." In addition, logical interfaces for VPNs carrying VPN communications through the service provider network can be easily specified by the "vpn" keyword followed by a string identifier for a customer VPN, listed as "VPN_NAME" in the syntax above. In this way, the administrator is able to easily identify customer VPNs that utilize VPN services of the service provider, and router 20 resolves the strings provided within the configuration data to VPNs provisioned through the service provider network. This allows the administrator to view the VPN tunnels as a logical interface for purposes of defining zones to which to apply firewall policies, even though many of those VPN tunnels may traverse the same physical interface. In this way, the administrator may define a plurality of zones (e.g., zones 30, 32 and 34 of FIG. 3), and for each zone may specify a collection of physical interfaces, VPNs or combinations thereof, that are to be considered by FW 22 as within that zone. The above syntax is merely illustrative. For example, in other embodiments the keywords "interface" or "vpn" may be omitted, or other keywords may be used.

In addition, the user interface of router 20 provides a syntax for defining security policies to be applied with respect to the defined zones. For example, router 20 may support a syntax as follows:

```
policy from-zone ZONE_NAME to-zone ZONE_NAME {
    match {
        source-address <s>;
        destination-address <d>;
        source-port <sp>;
        destination-port <dp>;
        application protocol <any>;
    }
    then {
        actions;
    }
}
```

In the example syntax above, the keyword "policy" indicates that the administrator is defining zone-based security policy to be applied by FW 22. The keyword "from-zone" indicates that the subsequent text specifies a defined zone from which traffic must be received for the policy to apply. The keyword "to-zone" indicates that the subsequent text specifies a defined zone to which the traffic must be destined for the policy to apply. As shown above, the policy includes a keyword "match" that allows the administrator to specify packet flow criteria, such as source network address, destination network address, source port, destination port, application protocol or other criteria. In addition, the policy specifies one or more actions to be applied to network traffic that is received via the "from-zone" for output on the "to-zone" and that matches any packet flow criteria specified in the policy. FW 22 then applies the actions enumerated in the policy to network traffic satisfying those conditions. Example actions including packet filtering, packet logging, intrusion detection and prevention, virus scanning, network address translation (NAT), policy-based authentication, and the like.

In accordance with the example syntax, an administrator may provide configuration data as follows:

```
zone untrust {
    vpn VPN-A; /* VPN carrying traffic from VPN site VPN-A*/
    vpn VPN-B; /* VPN carrying traffic from VPN site VPN-B*/
}
zone trust {
    interface ge-0/0/0.1; /*Physical interface for link to client site A*/
    interface so-2/4/2.0; /*Physical interface for link to client site B*/
}
policy from-zone untrust to-zone trust {
    then {
        apply virus_scanning;
    }
}
```

In this example, the administrator has defined two firewall zones, "untrust" and "trust." For the zone "untrust," the administrator has indicated that the zone includes VPN traffic carried by two VPN tunnels, VPN-A and VPN-B. For the zone "trust," the administrator has indicated that the zone includes a collection of two interfaces for forwarding traffic to client sites A and B. Further, the administrator has defined a policy for application to traffic received from an interface within the zone untrust and directed to an interface within the zone trust (e.g., VPN traffic from the MPLS core via VPN-A or VPN-B and directed to the client sites A or B as IP traffic). For such traffic, the policy requires FW 22 to apply stateful virus scanning algorithms to application layer data assembled from the packets.

Figure 4:
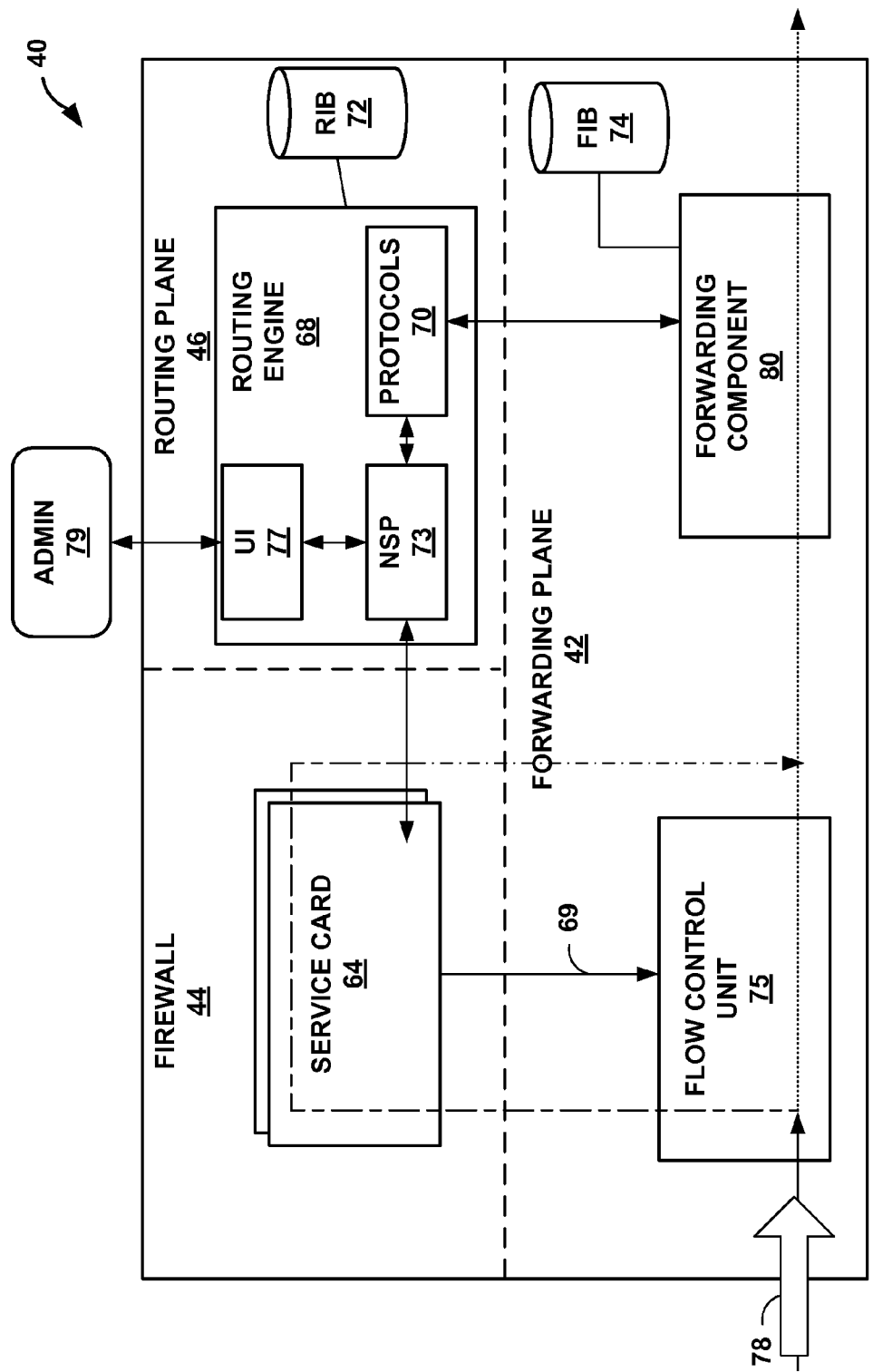
FIG. 4 is a block diagram illustrating an example router that integrates a routing component and an MPLS-aware firewall using a shared forwarding plane.

FIG. 4 is a block diagram illustrating an example router that integrates a routing component and an MPLS-aware firewall. Router 40 may, for example, be a high-end router capable of deployment within a service provider network. Moreover, forwarding plane 42 may be provided by dedicated forwarding integrated circuits normally associated with high-end routing and forwarding components of a network router. U.S. Patent Application 2008/0044181, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference.

As shown in the example embodiment of FIG. 4, router 10 integrates an MPLS-aware firewall 44 and a routing plane 46 that utilize a shared forwarding plane 42. Forwarding plane 42 is a rich and dynamic shared forwarding plane, optionally distributed over a multi-chassis router. Moreover, forwarding plane 42 may be provided by dedicated forwarding integrated circuits normally associated with high-end routing components of a network router. Consequently, routing plane 46 and forwarding plane 42 operate as a high-end router, and firewall 44 has been tightly integrated within router 40 (e.g., by way of service cards 64) so as to use forwarding plane 42 of the routing components in a shared, cooperative manner. Further details of one example embodiment of router 40 can be found in U.S. Provisional Patent Application 61/054,692, filed May 20, 2008, entitled "STREAMLINED PACKET FORWARDING USING DYNAMIC FILTERS FOR ROUTING AND SECURITY IN A SHARED FORWARDING PLANE," which is incorporated herein by reference.

Routing plane 46 provides a routing engine 68 that is primarily responsible for maintaining a routing information base (RIB) 72 to reflect the current topology of a network and other network entities to which router 40 is connected. For example, routing engine 68 provides an operating environment for execution of routing protocols 70 that communicate with peer routers and periodically update RIB 72 to accurately reflect the topology of the network and the other network entities. Example protocols include routing and label switching protocols, such as mpBGP, ISIS, RSVP-TE and LDP, to establish VPNs, LSPs and for exchanging labels.

In accordance with RIB 72, forwarding component 80 maintains forwarding information base (FIB) 74 that associates network destinations or MPLS labels with specific next hops and corresponding interface ports of output interface cards of router 40. Routing engine 68 typically processes RIB 72 to perform route selection and generate FIB 74 based on selected routes and allocated MPLS labels. In this way, routes as well as labeling information can be programmed into forwarding plane 42. Routing engine 68 may generate FIB 74 in the form of a radix tree having leaf nodes that represent destinations within the network. U.S. Pat. No. 7,184,437 provides details on an exemplary embodiment of a router that utilizes a radix tree for route resolution, the contents of which is incorporated herein by reference in its entirety.

When forwarding a packet, forwarding component 80 traverses the radix tree to a leaf node based on information within a header of the packet to ultimately select a next hop and output interface to which to forward the packet. Based on the selection, forwarding component may output the packet directly to the output interface or, in the case of a multi-stage switch fabric of a high-end router, may forward the packet to subsequent stages for switching to the proper output interface.

Network services process (NSP) 73 of routing engine 46 communicates with and programs service cards 64 of firewall 44. For example, routing engine may present a user interface (UI) 77 as described above so as to receive configuration data from administrator 79 defining firewall zones and policies with respect to physical interfaces, sub-interfaces or MPLS tunnels. In response, NSP 73 programs services cards 64 with corresponding configuration data, causing the service cards of firewall 44 to recognize the defined zones and apply the security policies when processing packets from forwarding plane 42. Each service card 64 may, for example, execute a microkernel that operates as a consumer of state information and listens for communications from NSP 73.

In this way, routing plane 46 and firewall 44 interact so that firewall 44 is made aware of state information associated with the MPLS traffic flowing through the routing device. For example, NSP 73 of routing engine 68 programs the service cards with information that associates customer VPNs with specific VPN labels and optionally one or more additional MPLS labels that have been used for tunneling the corresponding VPN traffic through the service provider network. NSP 73 may query protocols 70 and RIB 72 to provide the service cards 64 of firewall 44 with information maintained with the RIB for the VPN. For example, for VPN traffic that may be received by router 40 from a customer VPN, NSP 73 may provide information that identifies a VPN tag and optionally one or more MPS tags may will be affixed to the header of the packet and mapping information to associate this these labels with a customer VPN identifier (e.g., a text string or other identifier) that may be utilized by the administrator when defining input zones and policies. For VPN traffic that may be output by router 40 to the MPLS core, NSP 73 may provide mapping information that identifies a VPN label and optionally one or more MPLS labels to be applied by forwarding component 80 to IP traffic destined for the customer VPN, a corresponding next hop identifier for the traffic and a mapping to associate this <VPN label, next hop identifier> pair with a customer VPN identifier (e.g., a text string or other identifier) that may be utilized by the administrator when defining firewall zones and policies. Alternatively, the mapping information may provide other information useful in uniquely identifying the customer VPN, such as a route designator, a route target or other information.

Forwarding plane 42 may include a flow control unit 75 to selectively direct packets to firewall 44 for processing. For example, flow control unit 75 receives incoming packet flows 78 (e.g., IP traffic or VPN-encapsulated traffic) and determines whether to send the packets through the firewall 44 for processing within one or more of service cards 64, or whether to bypass the firewall 44. Service cards 24 receive packets from flow control unit 75, selectively provide firewall services to the packets in accordance with the defined zones and policies, and relay the packet or any response packets to forwarding plane 42 for forwarding by forwarding component 80 in accordance with FIB 74.

Service cards 24 within firewall 44 may be installed along a backplane or other interconnect of router 40 to perform a variety of firewall services on the packets received from forwarding plane 42, such as filtering, logging, Intrusion Detection and Prevention (IDP) analysis, virus scanning, deep packet inspection. In some cases, service card 24 may issue commands 36 to dynamically configure a flow table (not shown) within flow control unit 75 of forwarding plane 42. For example, when flow control unit 75 receives a packet and determines that the packet belongs to a new packet flow that does not match any of its filters, flow control unit 75 may send the packet to service cards 64 for processing. Upon receiving and processing the packet or packets of a packet flow, service cards 64 may issue a command 69 to install a dynamic filter within the flow table, such as an exact match filter that indicates particular actions to be performed when a packet is received that matches the filter. In the case that service cards 64 determine no further firewall services need be applied to a packet flow (e.g., after determining that the packet flow is trusted or benign), service cards 64 may install a filter within flow control unit 75 to specify that subsequent packets of this packet flow session may be processed on a straight path that bypasses firewall 44. When flow control unit 75 receives a subsequent packet of the same packet flow, flow control unit 75 checks the flow table, determines that the packet matches the new dynamic filter, and directs the packet on the appropriate path according to the dynamic filter.

In this example, routing and firewall services are integrated within a single router 40 that uses a shared forwarding plane 42 suitable for high-speed forwarding functions required by MPLS routers, such as PE routers 10 of FIG. 1.

Figure 5:
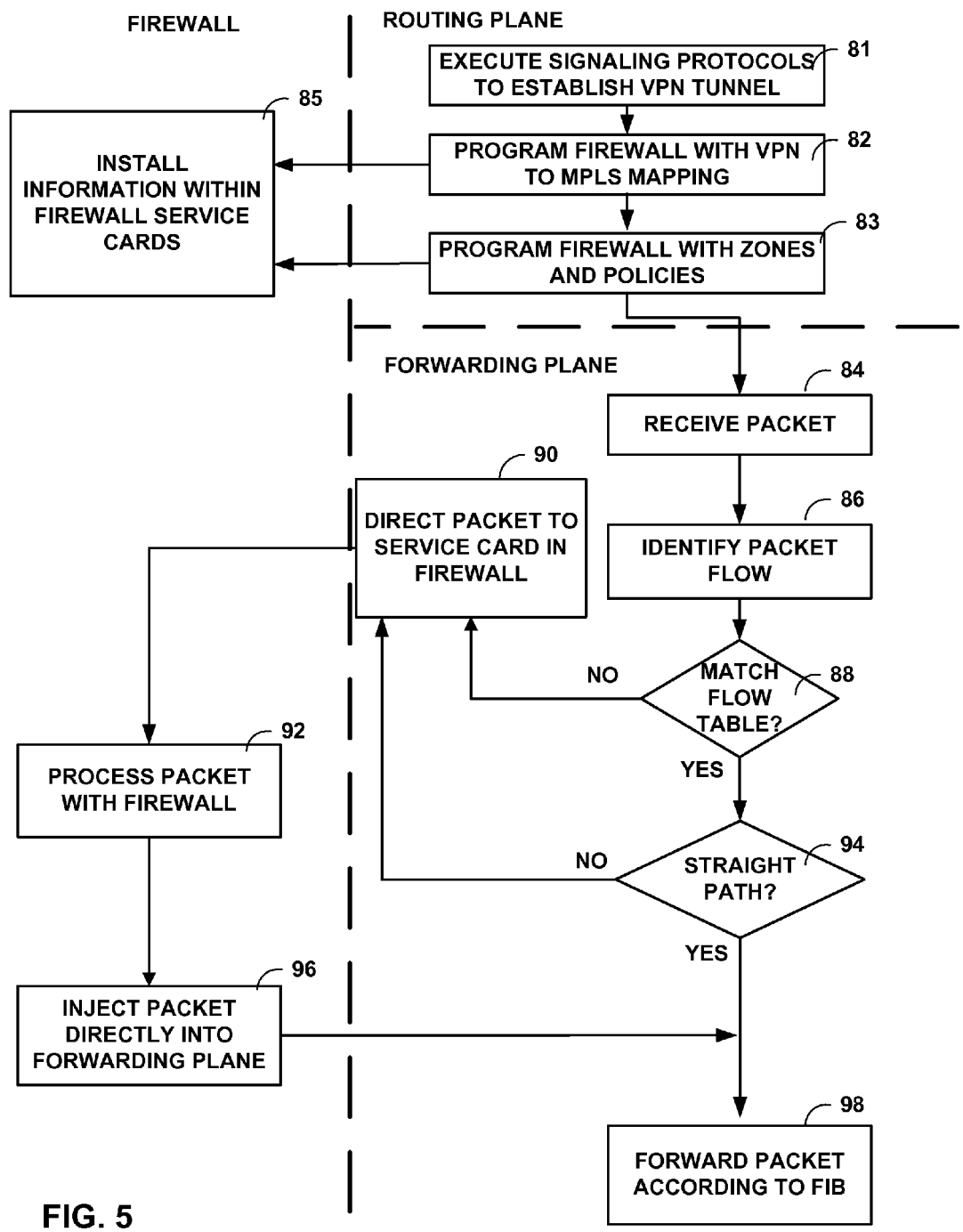
FIG. 5 is a flowchart illustrating example operation of router of FIG. 4 in accordance with the principles of the invention.

FIG. 5 is a flowchart illustrating example operation of router 40 of FIG. 4 in accordance with the principles of the invention. Initially, routing engine 68 executes protocols 70, such as mpBGP to exchange VPN information, including VPN identifiers, VPN routes and VPN labels (81). In addition, routing engine may optionally utilize RSVP-TE, LSP or other mPLS protocols to establish one or more MPLS tunnels (i.e., LSPs) for carrying the VPN traffic through the service provider network for various customer VPN sites (81). At this time, routing engine 68 updates RIB 72 and programs forwarding component 80 in accordance with the VPN routes, VPN labels as well as any additional MPLS labels allocated to carry the VPN traffic. In addition, NSP 73 of routing engine 46 programs service cards 64 of firewall 44 with a mapping that associates the customer VPN information with the specific VPN labels, and optionally any additional MPLS labels, used in communicating VPN traffic to and from the next hop(s) within the service provider network (82, 85). Further, NSP programs service cards 64 with configuration data received from the administrator defining firewall zones and policies with respect to either physical interfaces or the individual customer VPNs, causing the service cards of firewall 44 to recognize the defined zones and applying the security policies when processing packets from forwarding plane 42 (83, 85).

After configuration and establishment of the VPN tunnels, router 40 receives a packet, which may be IP traffic from a VPN site or VPN traffic from a VPN tunnel (optionally carried by an LSP) through the service provider network (84). In one optional example, a flow control unit 75 of the forwarding plane 42 analyzes the received packet to identify a packet flow associated with the packet (86), e.g., using a flow-based provisioning logic to identify a five-tuple based on information carried in the header or body of the packet. Upon identifying the packet flow, flow control unit 75 references an internal flow table to determine whether belongs to a new packet flow or a packet flow already recognized by the router (88).

If flow control unit 75 does not find a match in the flow table (NO branch of 88), which indicates that the packet belongs to a new packet flow, the flow control unit directs the packet to service cards 64 of firewall 44 for firewall services (90). When the packet is directed to firewall 44, one of service cards 64 applies stateful firewall services to the packet (92). For example, the service cards 64 may extract and assemble application layer data from the packet, and a deep packet inspection (DPI) engine may perform Intrusion Detection and Prevention (IDP) analysis and/or virus scanning to filter out bad packets. As a further example, the service card 24 may perform ciphering, NAT or authentication services.

After applying firewall services, service cards 64 then inject the packet into forwarding plane 42 for forwarding by forwarding component 80 in accordance with FIB 74 (96). At this time, service cards 64 of firewall 44 may signal flow control unit 75 and direct the flow control unit to install criteria in its internal flow table designating whether subsequent packets of the packet flow should be trusted such that firewall services need not be applied, or whether the subsequent packets should continue to be directed to firewall 44.

If, however, flow control unit 75 finds a match in the flow table (YES branch of 88) for the received packet and the matching entry directs the packet onto a straight path for processing (YES branch of 94), flow control module 20 does not forward the packet to firewall 44 but signals forwarding component 80 that the packet can immediately be forwarded in accordance with FIB (74).

If the matching entry of the flow table indicates that firewall services are to be applied to the recognized packet flow (NO branch of 94), then flow control unit 75 directs the packet to service cards 64 of firewall 44 for firewall services (90, 92) and subsequent forwarding by forwarding component 88 (98).

Figure 6:
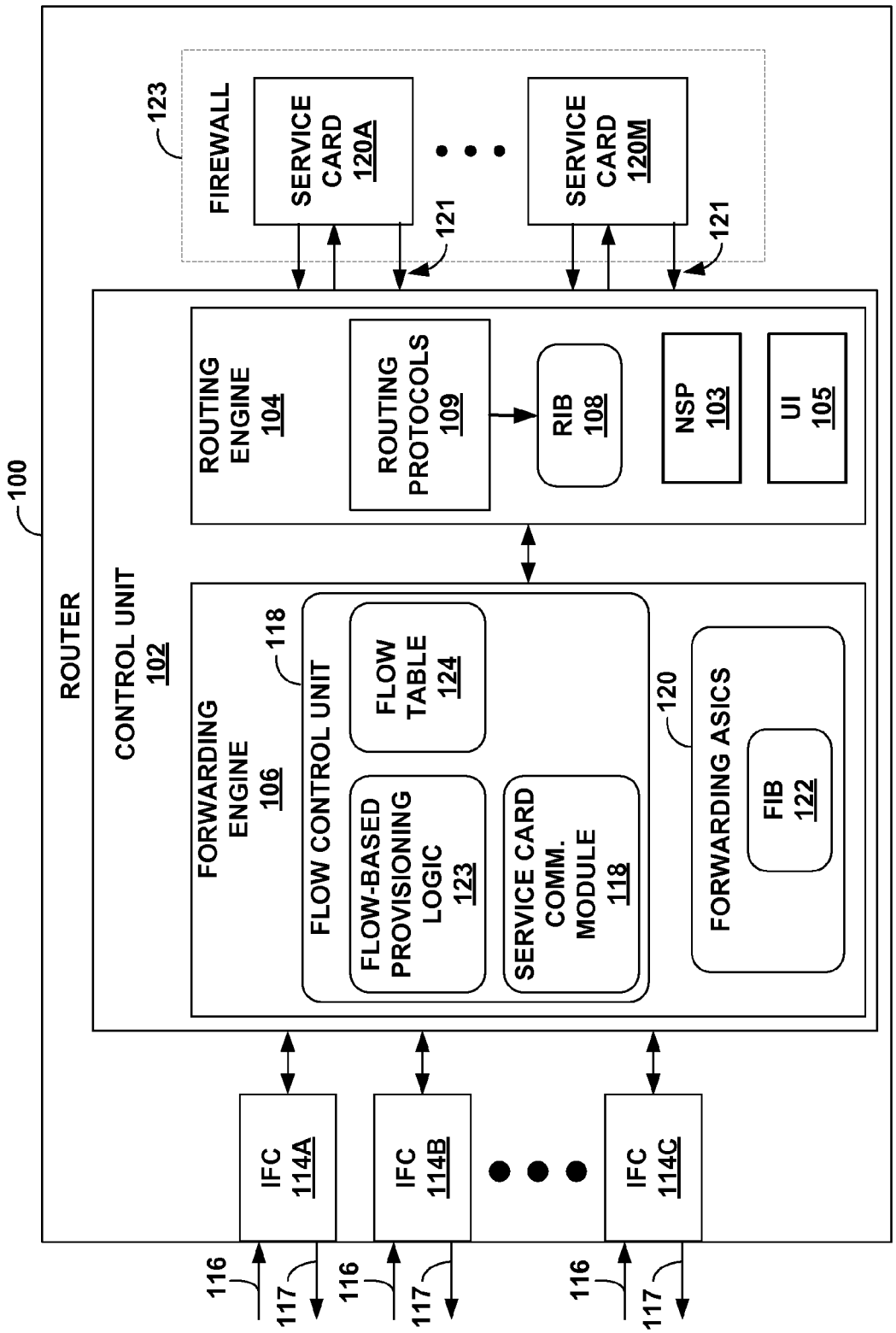
FIG. 6 is a block diagram illustrating in further detail an example router that integrates a routing component and an MPLS-aware firewall using a shared forwarding plane.

FIG. 6 is a block diagram illustrating in further detail an example router 100 that integrates a routing engine 104 and an MPLS-aware firewall 123 using a shared forwarding plane provided by forwarding engine 106. Features of router 100 may, for example, be incorporated within any of PE routers 10, router 20, or router 30 described above.

Router 100 comprises a control unit 102 that includes a routing engine 104 and a forwarding engine 106. Routing engine 104 is primarily responsible for maintaining routing information base (RIB) 88 to reflect the current topology of a network and other network entities to which it is connected. In particular, routing engine 104 periodically updates RIB 108 to accurately reflect the topology of the network and other entities. Routing engine 104 also includes routing protocols 89 that perform routing operations, including protocols for establishing VPNs and optionally LSPs through a network.

UI module 105 represents software executing on routing engine 104 that presents a command line interface (e.g., via a shell or Telnet session) for receiving configuration data as described herein, including firewall configuration data defining zones and zone-based policies for application by service cards 120 of firewall 123. NSP 73 of routing engine 46 communicates with and programs service cards 64 of firewall 123 as described above.

In accordance with RIB 108, forwarding application specific integrated circuits (ASICs) 90 of forwarding engine 106 maintain forwarding information base (FIB) 122 that associates network destinations or MPLS labels with specific next hops and corresponding interface ports. For example, control unit 102 analyzes RIB 108 and generates FIB 122 in accordance with RIB 108. Router 100 includes interface cards 114A-114N ("IFCs 114") that receive and send packets via network links 116 and 117, respectively. IFCs 114 may be coupled to network links 116, 117 via a number of interface ports.

Generally, flow control unit 118 of forwarding engine 106 may relay certain packets received from IFCs 94 to service cards 120A-120M ("service cards 120") in accordance with a flow filter table 124. Service cards 120 receive packets from flow control unit 118, selectively provide firewall services in accordance with information within the packet, and relay the packet or any response packets to control unit 102 for forwarding by forwarding ASICs 120. Forwarding ASICs 120 may comprise one or more dedicated packet forwarding integrated circuits.

Flow control unit 118 includes flow-based provisioning logic 102 that distinguishes between packet flow sessions based on a five-tuple found within a header of each received packet and steers packets of the same flows to the same one of service cards 120 for application of stateful firewall services. Flow control unit 118 references flow filter table 104 as described above to determine whether a received packet corresponds to a trusted packet flow that may be processed via a straight path (i.e., bypassing service cards 120 entirely), or whether the received packet corresponds to an unknown or untrusted packet flow session and should therefore be sent to one of service cards 120 for further inspection and application of firewall services. Upon application of firewall services, service cards 120 may provide feedback to flow control unit 118 via service card communication module 106 (SERVICE CARD COMM. MODULE 106) to dynamically update flow table 124. That is, service cards 120 may update flow filter table 124 via commands 121 to service card communication module 108.

In one embodiment, each of forwarding engine 106 and routing engine 104 may comprise one or more dedicated processors, hardware, ASICs or the like, and may be communicatively coupled by a data communication channel. The data communication channel may be a high-speed network connection, bus, shared-memory or other data communication mechanism. Router 100 may further include a chassis (not shown) for housing control unit 102. The chassis has a number of slots (not shown) for receiving a set of cards, including IFCs 94 and service cards 120. Each card may be inserted into a corresponding slot of the chassis for electrically coupling the card to control unit 102 via a bus, backplane, or other electrical communication mechanism.

Router 100 may operate according to program code having executable instructions fetched from a computer-readable storage medium (not shown). Examples of such media include random access memory (RAM), read-only memory (ROM), non-volatile random access memory (NVRAM), electrically erasable programmable read-only memory (EEPROM), flash memory, and the like. The functions of router 100 may be implemented by executing the instructions of the computer-readable storage medium with one or more processors, discrete hardware circuitry, firmware, software executing on a programmable processor, or a combination of any of the above.

Figure 7:
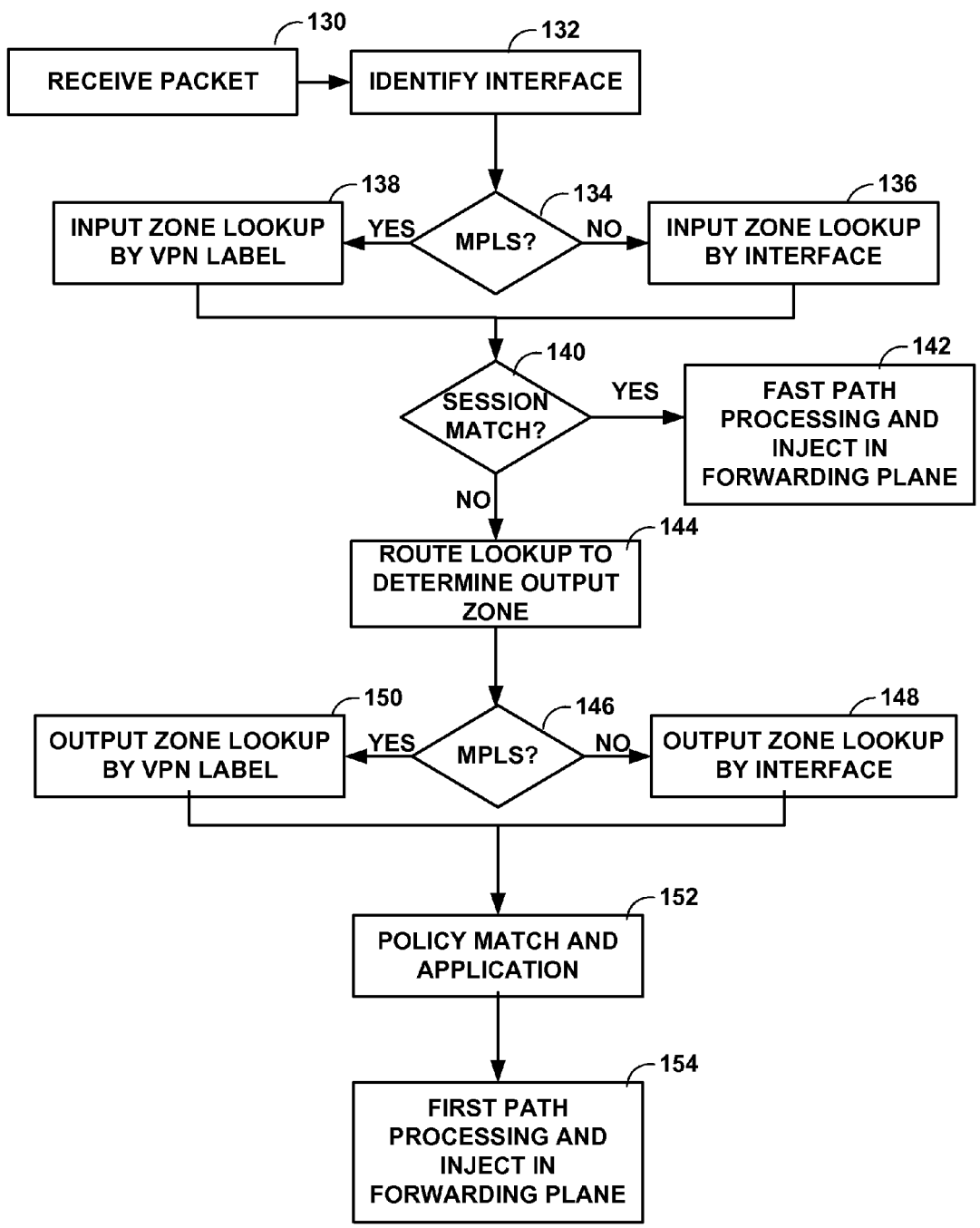
FIG. 7 is a flowchart further illustrating example operation of an MPLS-aware firewall router.

FIG. 7 is a flowchart illustrating exemplary operation of an MPLS-aware firewall, e.g., any of firewalls 12, 22, 44, 123 described above. For exemplary purposes, the flowchart of FIG. 7 will be explained in reference to firewall 123 and its one or more service cards 120 illustrated in FIG. 6.

Upon receiving a packet from packet from forwarding engine 106 (130), firewall 123 processes the packet to identify the input interface by which the packet was initially received by router 100 (132). In one example, either the IFC 114 upon which the packet was received or the forwarding engine 106 determines the specific input interface upon which the packet was received by router 100 and attaches information to the packet identifying the particular interface prior to relaying the packet to firewall 123 for processing.

Next, firewall 123 analyzes the header of the packet to determine if the input packet is an IP packet and not a VPN packet that has a VPN label and that was received from the service provider network via a VPN. If so, then firewall 123 accesses its internal configuration data and determines whether the administrator has defined any input zone that includes the physical interface upon which the packet was received (136).

If, however, the packet is an VPN packet having either a single VPN label or an MPLS stack in which the VPN label is the inner label, firewall 123 accesses the configuration data and determines whether the administrator has defined an input zone that for the customer VPN from which the packet was received (138). That is, firewall 123 reads the packet's inner VPN label and accesses the mapping information provided by NSP 103 of routing engine 104 to map the in VPN label to a customer VPN identifier, e.g., string or numerical identifier. The inner label of the received packet, i.e., the VPN label, is typically a label previously allocated by the router using mpBGP and issued to an upstream LSR along the VPN tunnel. Thus, routing engine 104 has knowledge of this VPN label, and the mapping information provided to firewall 123 by NSP 103 maps this VPN label to the particular customer VPN identifier, thereby allowing the administrator to specify that customer VPN in policies and zones within the firewall configuration data. Upon identifying the customer VPN from the inner VPN label based on the mapping information from NSP 103, firewall 123 parses the configuration data to determine whether the administrator has defined any input zone that includes the customer VPN within the zone's collection of interfaces.

After determining the input zone, firewall 123 determines whether the packet matches an existing packet flow session currently being processed by firewall 123 (140). If so, firewall 123 may place the packet on fast path processing for immediate forwarding by forwarding engine 106. For example, when fast path processing the packet, firewall 123 need not perform the computationally intensive task of initializing and updating session information for the new packet. Moreover, firewall 123 need not apply policies to the packet as such policies may have already been applied to the packet flow.

If the packet does not match an existing packet flow (NO branch of 140), firewall 123 performs a route lookup on the packet to determine a next hop and, based on the next hop, an output interface for the packet (144). For example, one or more of service cards 120 of firewall 123 may be programmed by routing engine 104 and installed with a copy of all or a portion of FIB 122 as used by forwarding ASICs 120. Alternatively, FIB 122 of forwarding ASICs 130 may be stored in a shared memory accessible via service cards 120. In either case, firewall 123 traverses the FIB based on information within the packet so as to determine the next hop and corresponding output interface for the packet. Further, based on information installed within the copy of the FIB, firewall 123 determines based on the route lookup whether the packet will be output as IP traffic or as VPN traffic to be injected into the service provider network (146).

If the route lookup indicates that the packet will not be output as a VPN packet having a VPN label and optionally one or more outer MPLS labels, but instead the packet will be output as an IP packet, then firewall 123 accesses the configuration data and determines whether the administrator has defined any output zone that includes the output interface to which the IP packet is destined (148).

If, however, the route lookup indicates that the packet is to be encapsulated and output by forwarding engine 106 as an VPN packet, firewall 123 accesses the configuration data and determines whether the administrator has defined any output zone that includes the customer VPN to which the packet will be output (150). That is, based on the route lookup, firewall 123 determines the inner forwarding equivalence class (FEC) label, i.e., the VPN label that will ultimately be prepended to the packet by the forwarding engine 106 when forwarding the packet. In addition, firewall 123 determines, based on the route lookup, the next hop to which the VPN packet will be forwarded. Next, firewall 123 accesses the mapping data provided by NSP 103 of routing engine 104 to map the data pair <VPN label, next hop> to a specific customer VPN identifier. Firewall 123 uses both the VPN label to be applied to the packet as well as the next hop since, for VPN traffic leaving router 100 and entering the MPLS core of the service provider network, the VPN labels have likely been allocated by upstream routers along the VPN tunnels and, as such, may be duplicative. Thus, for egress VPN traffic to be injected into a VPN tunnel, firewall 123 identifies the correct customer VPNs to which the packet is destined by indexing the mapping information provided by NSP 103 based on the unique pair: <VPN label, next hop> learned in the route lookup for the packet. Other information may be used, such as route designators and/or route targets for the customer VPNs. Upon resolving the customer VPN identified from the mapping, firewall 123 accesses its configuration data to identify any output zone that the administrator has defined that includes the customer VPN to which the packet is destined.

Next, having determined the input zone and the output zone for the packet, firewall 123 accesses its configuration data to identify any policy that has been defined for traffic traveling between the zones. At this time, firewall 123 also applies any packet flow criteria that have been defined by the policies. Upon identifying the matching policies, firewall 123 applies to the packet the actions specified by those policies (152).

After applying the policies, firewall 123 processes the packet along a "first path" by initializing and creating session information to maintain state for the packet flow. Finally, firewall 123 injects the packet into forwarding engine 106 for forwarding in accordance with FIB 122 (154). In this example, router 100 integrates MPLS-aware, zone-based firewall security features in single network device. Moreover, a full mesh of zone-based policies can be defined and applied seamlessly with respect to physical interfaces as well as customer VPNs.

Figure 8:
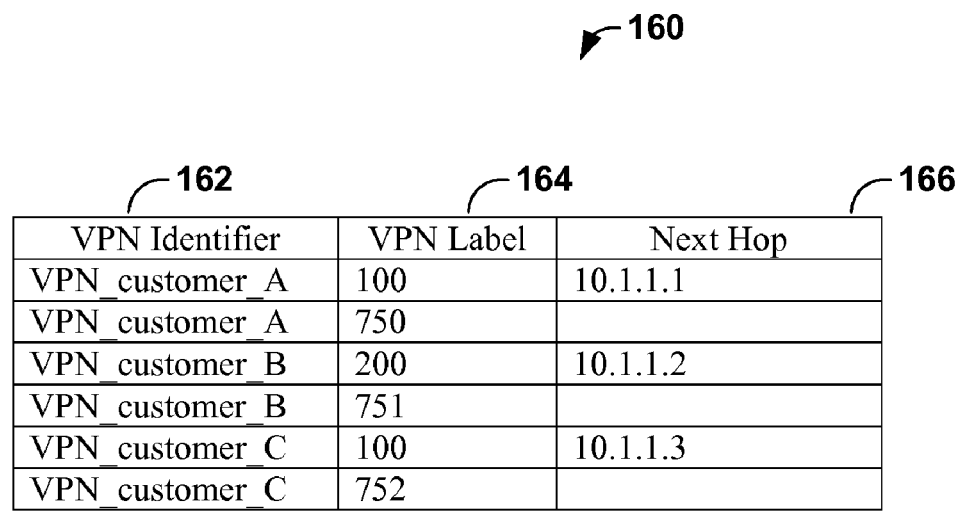
FIG. 8 illustrates example mapping information provided by a routing component to an integrated firewall of a network device enabling security services to be applied to MPLS tunnels.

FIG. 8 illustrates example mapping information 160 provided by a routing component to an integrated firewall of a network device (e.g., from NSP 73 of routing engine 68 to firewall 44 of router 40) to enable security services to be applied to MPLS-based customer VPNs. Alternatively, the forwarding plane 42 can dynamically identify the VPN tunnel, e.g., by the customer interface on which the traffic arrived, and communicate mapping information to firewall 44 and/or routing engine 68. In any event, as shown in FIG. 8, the example mapping information 160 includes a plurality of entries, each entry listing a customer VPN identifier 162 (e.g., a text string or other identifier) that was provided by the administrator when defining input zones and policies via interaction with a user interface, such as UI 75.

For example, the first and second entries of mapping information include a customer VPN identifier "VPN_customer_A" representing a string specified by the administrator when defining an interface for an input zone for the firewall, as shown in the examples discussed above. In response to the use of a new customer VPN identifier within the configuration data for the firewall, the routing component (e.g., NSP 73 of routing engine 68) creates two entries in mapping information 160. The first entry maps the customer VPN identifier to an MPLS label to be applied by the router's forwarding component (e.g., forwarding component 80) when encapsulating IP traffic destined for that particular customer's VPN site as well as a corresponding next hop identifier for the traffic. The second entry maps that same customer VPN identifier to a VPN label that is expected to be affixed to inbound traffic received from the customer's VPN site, optionally as an inner label of an MPLS label stack.

For example, the first entry of mapping information 160 maps the string "VPN_Customer_A" to an <VPN label 100, next hop identifier 10.1.1.1> pair. In this way, the first entry resolves the string utilized in the firewall configuration data to a specific inner VPN label to be used for outbound VPN traffic to be injected into the service provider network, optionally along an LSP. The second entry of mapping information 160 maps the string "VPN_Customer_A" to a VPN label 750 previously allocated by the router and expected to be affixed to VPN traffic received by the inbound VPN tunnel for that customer VPN site. Mapping information 160 may be input by the administrator to resolve the firewall configuration information to specific VPN tunnels and next hops where necessary, or the routing component may determine this information dynamically based on the RIB and corresponding FIB utilized for routing and forwarding purposes. Other information may be used in addition to or in place of the next hop, such as a route designator or route target for the customer VPN.

Figure 9:
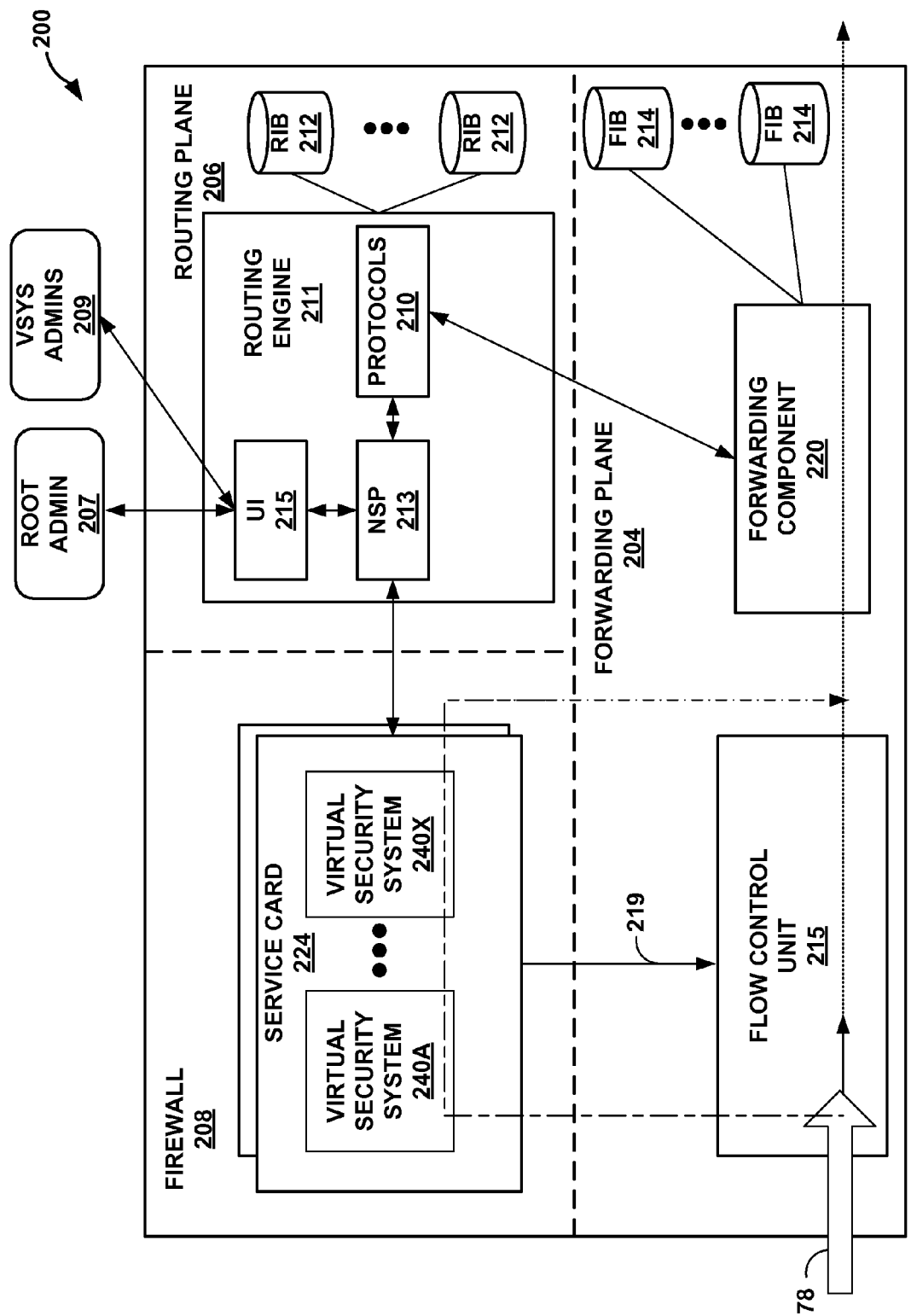
FIG. 9 is a block diagram illustrating an example router having support for virtual security systems and integrating a routing component and an MPLS-aware firewall using a shared forwarding plane.

FIG. 9 is a block diagram illustrating another example of a router 200 that integrates a routing plane 206 and an MPLS-aware firewall 208 using a shared forwarding plane 204. Features of router 200 may, for example, be incorporated within any of PE routers 10, router 20, router 30 or router 100 described above.

In the example of FIG. 9, firewall 208 has been logically partitioned into multiple virtual security systems 240A-240X to provide multi-tenant security services. That is, virtual security systems 240 represent logically partitioned firewall instances providing separate security services, including MPLS-aware zone-based firewall services, that are applied by firewall 208. Router 200 presents virtual security systems 240 as logically independent firewalls that can be independently configured even though the virtual security systems may share computing resources of service cards 224.

For example, a root-level administrator 207 ("ROOT ADMIN 207") is a central, overarching security and system administrator that may control and administer a ROOT one of virtual security systems 240. In this way, root-level administrator 207 can access and configure any custom VSYS specific security resources, as well as manage any shared security resources, such as a SHARED-UNTRUST zone, which is a commonly shared connection to the Internet used by multiple internal security zones. The root-level administrator 207 also controls the initial assignment of interfaces and zones.

For example, a root-level administrator 207 may interact with UI 215 to provide configuration data to define virtual security systems 240 and, for each of the virtual security systems, specify one or more virtual security system (VSYS) administrators 209 ("VSYS ADMINS 209"). Each of virtual security systems 240 is presented to the corresponding VSYS administrator 209 as a unique security domain, and the VSYS administrator 209 for each virtual system 240 can individualize their security domain by defining specific zones and policies to be applied to traffic associated with that virtual system 240. Each virtual security system 240 can be configured to have its own totally separated set of security zones, policy rule set and management domain. In this way, virtual security systems 240 logically segment integrated MPLS-aware firewall 208 into multiple security devices. Each VSYS administrator 209 may interact with US 215 in the manner described herein so as to provide configuration data for a specific virtual system 240, including defining firewall zones and policies with respect to physical interfaces, sub-interfaces, or customer VPNs. Management interfaces presented by UI 215 are specific to the particular virtual security system 240 being configured and managed, and each of the virtual security systems 240 appears as a discrete security device to the individual VSYS administrator 209. This means that each distinct virtual security system 240 may have, for example, its own web interface, operational management connections and views. The VSYS administrator 209 of one virtual security systems 240 is isolated to the configuration and operation of his or her own virtual system.

As one example, user interface 215 of router 200 provides a syntax for defining security policies to be applied with respect to the defined zones for specific virtual security systems 240. For example, router 200 may support a syntax as follows:

```
vsys VSYS-IDENTIFIER {
    zone ZONE_NAME {
        interface INTERFACE_NAME;
        ...
        interface INTERFACE_NAME;
        vpn VPN_NAME;
        ...
        vpn VPN_NAME;
    }
    policy from-zone ZONE_NAME to-zone ZONE_NAME {
        match {
            source-address <s>;
            destination-address <d>;
            source-port <sp>;
            destination-port <dp>;
            application protocol <any>;
        }
        then {
            actions;
        }
    }
}
```

In the example above, the keyword "vsys" indicates that the subsequent configuration data applies to a specific one of virtual security systems 240. This outer information may be omitted by vsys administrators 209 and the corresponding one of virtual security system 40 may be automatically determined by UI 215. In any case, the administrator may define zones and policies using the keywords "zone" and "policy," as described above, for the particular virtual system 240. The above syntax is merely illustrative.

In accordance with an example syntax, an administrator may provide configuration data as follows:

```
vsys Customer-A {
    zone untrust {
        vpn VPN-A; /* VPN carrying traffic for VPN site VPN-A*/
        vpn VPN-B; /* VPN carrying traffic for VPN site VPN-B*/
    }
    zone trust {
        interface ge-0/0/0.1; /*Physical interface for link to client site
            A*/
        interface so-2/4/2.0; /*Physical interface for link to client site
            B*/
    }
    policy from-zone untrust to-zone trust {
        then {
            apply virus_scanning;
        }
    }
}
```

This example is similar to the example above, and the administrator has defined two firewall zones, "untrust" and "trust." For the zone "untrust," the administrator has indicated that the zone includes VPN traffic carried by two customer VPNs, VPN-A and VPN-B. For the zone "trust," the administrator has indicated that the zone includes a collection of two interfaces for forwarding traffic to client sites A and B. Further, the administrator has defined a policy for application to traffic received from an interface within the zone untrust and directed to an interface within the zone trust (e.g., VPN traffic from the MPLS core via VPN-A or VPN-B and directed to the client sites A or B as IP traffic). For such traffic, the policy requires the virtual security system identified as "Customer-A" (e.g., virtual security system 240) of FW 208 to apply stateful virus scanning algorithms to application layer data assembled from the packets that correspond to that particular virtual security system and forwarded in accordance with its specific FIB 214.

As virtual security systems, each of virtual security systems 240 may share the same hardware resources provided by service cards 224. For example, computing resources provided by service cards 224 may apply security policies for any of virtual security systems 240 to the network traffic associated with that particular virtual system. Further, weightings, time quotas or percentages of CPU or other hardware usage can be allocated and enforced so as to ensure fair usage by virtual security systems 240 so that consumption of hardware resources by one of the virtual system, such as in response to a denial of service attack, does not impact the performance of all of the other virtual security systems. Alternatively or in addition, virtual security systems 240 may be allocated to specific service cards 224.

In addition, in response to creation of virtual security systems 240, router 200 may manage resources of routing engine 211 and forwarding plane 204 so as to provide a plurality of virtual routers, where each virtual security system 240 may optionally map to a different virtual router. A virtual router is a separate routing instance within router 200, and each instance may execute its own routing protocol and maintain its own settings, route table (RIB), and routing updates. Each virtual router participates in its own routing domain; multiple virtual routers allow a single device (e.g., router 200) to participate in multiple routing domains completely separated from each other. That is, routing engine 211 may maintain a logically separate RIB 212 for each virtual security system 240. Further, for each RIB 212, routing engine 211 programs forwarding component 220 with a corresponding FIB 214 in accordance with the routes, as well as the MPLS labels associated with the routes, for the virtual system 240. In other words, routing engine 211 may program forwarding component 220 with logically isolated FIBs 212, one for each virtual security system 240, and forwarding component 220 applies the appropriate FIB when making packet forwarding decisions.

In a manner similar to that described above with respect to FIG. 4, NSP 213 programs firewall 208 with configuration data. In this case, NSP 213 programs configuration data for each of virtual security systems 240, causing the service cards 224 of firewall 208 to recognize the zones and security policies defined for the different virtual security systems when processing packets from forwarding plane 204. Each service card 224 may, for example, execute a microkernel that operates as a consumer of state information and listens for communications from NSP 213. In this way, routing plane 206 and firewall 208 interact so that firewall 208 provides support for multiple virtual security systems and is made aware of state information associated with the VPN traffic flowing through the routing device.

For example, NSP 213 of routing engine 211 programs the service cards 224 with information that creates virtual security systems 240 and then, for each of the virtual security system, associates customer VPNs for that virtual security system with specific VPN labels that have been used for tunneling the corresponding VPN traffic through the service provider network. NSP 213 may query the corresponding protocols 210 and RIB 212 for the respective virtual security system 240 to provide the service cards 224 of firewall 208 with information maintained with that specific RIB for that specific virtual security system. For example, for VPN traffic that may be received by router 200 for a virtual security system 240, NSP 213 may provide information that identifies one or more VPN tags that will be affixed to the header of the packet and mapping information to associate this VPN label with a customer VPN identifier (e.g., a text string or other identifier) that may be utilized by the VSYS administrator 209 when defining input zones and policies for that particular virtual security system. For VPN traffic that may be output by router 200 to the service provider network in association with a virtual security system 240, NSP 213 may provide mapping information that identifies any one or more VPN labels to be applied by forwarding component 220 to IP traffic destined for the customer VPN, a corresponding next hop identifier for the traffic and a mapping to associate this <VPN label, next hop identifier> pair with a customer VPN identifier (e.g., a text string or other identifier) that may be utilized by the VSYS administrator 209 when defining firewall zones and policies for that virtual security system.

Forwarding plane 204 may include a flow control unit 215 that operates in a manner similar to flow control unit 75 (FIG. 4) to selectively direct packets to firewall 208 for processing. Service cards 224 may issue commands 219 to install dynamic filters within flow control unit 215 to control packet diversion to firewall 208.

Figure 10:
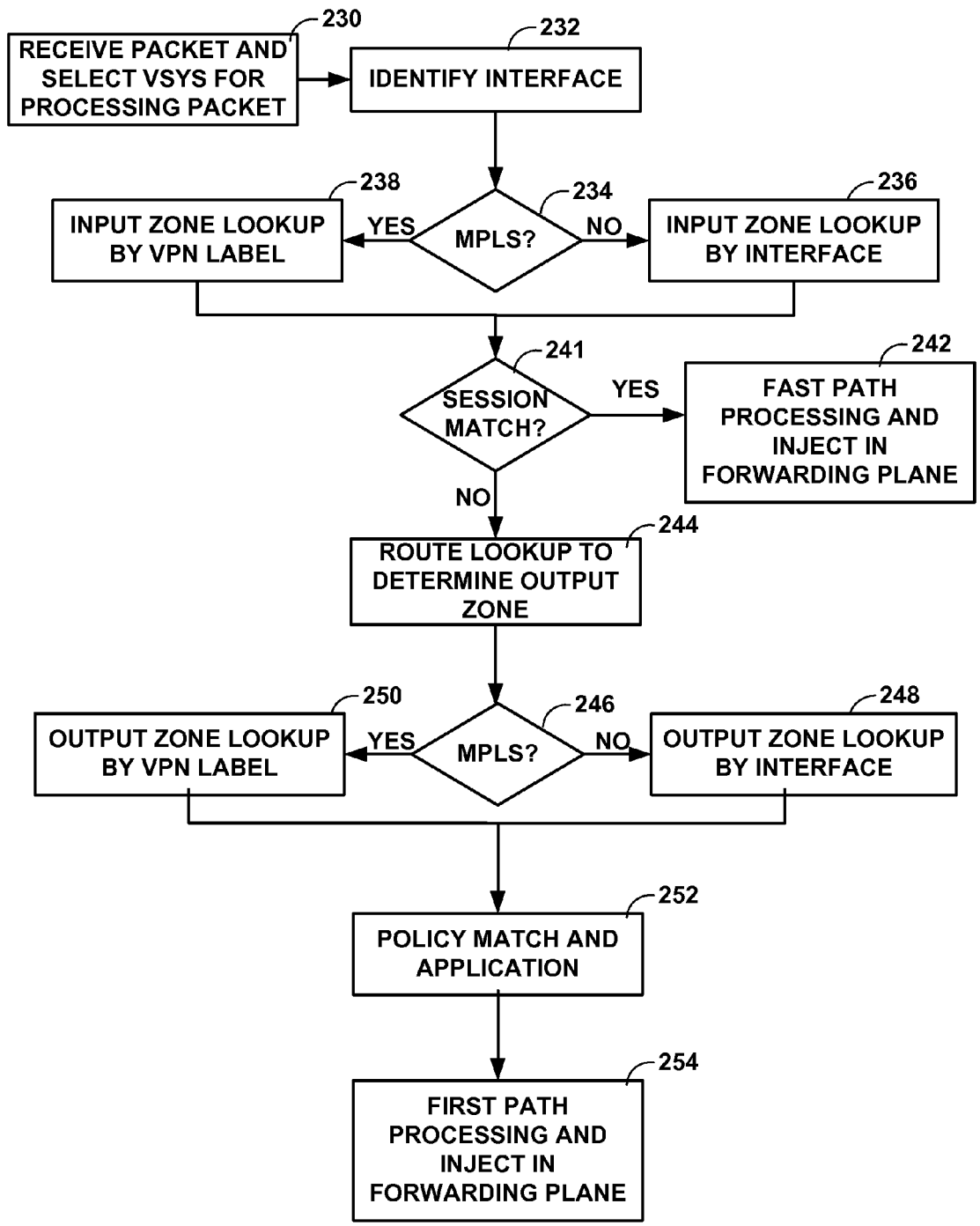
FIG. 10 is a flowchart further illustrating example operation of an MPLS-aware firewall router having support for virtual security systems.

FIG. 10 is a flowchart illustrating exemplary operation of an MPLS-aware firewall, e.g., any of firewalls 12, 22, 44, 123, 200 described above. For exemplary purposes, the flowchart of FIG. 10 will be explained in reference to firewall 200 and its one or more service cards 224 illustrated in FIG. 9.

Upon receiving a packet from packet from forwarding plane 204 (230), firewall 208 first classifies the packet into one of virtual security systems 240 based on source and/or destination information for VLAN, interfaces, IP address or combinations thereof. Next, one or more of service cards 244 associated with the virtual security system 240 to which the packet is classified (associated) processes the packet to identify the input interface by which the packet was initially received by router 200 (232). In one example, either the IFC upon which the packet was received or the forwarding plane 204 determines the specific input interface upon which the packet was received by router 200 and attaches information to the packet identifying the particular interface prior to relaying the packet to firewall 208 for processing.

Next, firewall 208 (i.e., the particular one or more service cards 224 of firewall 208 providing the execution environment for the virtual security system 240 for the packet) analyzes the header of the packet to determine if the input packet is an IP packet and not a VPN packet that was received from the service provider network via a VPN tunnel. If so, then firewall 208 accesses root configuration data as well as configuration data for the specific virtual security system 240 associated with the packet to determine whether either the root administrator 207 or the VSYS administrator 209 has defined any input zone, for that specific virtual security system 240, that includes the physical interface upon which the packet was received (236).

If, however, the packet is a VPN packet having a VPN label (optionally as an inner label of an MPLS label stack), firewall 208 accesses root configuration data as well as configuration data for the specific virtual security system 240 associated with the packet to determine whether either the root administrator 207 or the VSYS administrator 209 has defined any input zone for that specific virtual security system 240 that includes the customer VPN from which the packet was received (238). That is, firewall 208 reads the packet's inner VPN label and accesses the mapping information provided by NSP 213 of routing engine 211 to map the inner VPN label to a customer VPN identifier, e.g., string or numerical identifier, used within the RIB 212 for that particular virtual security system 240.

After determining the input zone, firewall 208 determines whether the packet matches an existing packet flow session currently being processed by firewall 208 (240). If so, firewall 208 may place the packet on fast path processing for immediate forwarding by forwarding component 220. For example, when fast path processing the packet, firewall 208 need not perform the computationally intensive task of initializing and updating session information for the new packet. Moreover, firewall 208 need not apply policies to the packet as such policies may have already been applied to the packet flow.

If the packet does not match an existing packet flow (NO branch of 241), firewall 208 performs a route lookup on the packet to determine a next hop and, based on the next hop, an output interface for the packet (244). For example, the service cards 224 to which virtual security systems 240 are allocated may be programmed by routing engine 211 and installed with a copy of all or a portion of FIBs 214 for the respective virtual system. Alternatively, FIBs 214 may be stored in a shared memory accessible via service cards 224. In either case, when performing a route lookup, firewall 208 selects the FIB 214 for the virtual security system 240 associated with the packet and traverses that FIB based on information within the packet so as to determine the next hop and corresponding output interface for the packet. Further, based on information installed within the copy of the corresponding FIB, firewall 208 determines based on the route lookup whether the packet will be output as IP traffic or as VPN traffic having a prepended VPN label (246).

If the route lookup indicates that the packet will not be output as a VPN packet on a VPN tunnel but instead the packet will be output as an IP packet, then firewall 208 accesses the root configuration data and the configuration data for the particular virtual security system 240 to determine whether the root administrator 207 or the corresponding VSYS administrator 209 has defined any output zone that includes the output interface to which the IP packet is destined (248).

If, however, the route lookup indicates that the packet is to be encapsulated and output by forwarding component 220 as a VPN packet on an VPN tunnel, firewall 208 accesses the root configuration data and the configuration data for the particular virtual security system 240 to determine whether the root administrator 207 or the corresponding VSYS administrator 209 has defined any output zone that includes the customer VPN to which the packet will be output (250). That is, based on the route lookup, firewall 208 determines the outer forwarding equivalence class (FEC) label, the VPN label that will ultimately be prepended to the packet by forwarding component 220 when forwarding the packet using the FIB 214 for the particular virtual security system 240. In addition, firewall 208 determines, based on the route lookup using the copy of the appropriate FIB 214, the next hop to which the VPN packet will be forwarded. Next, firewall 208 accesses the mapping data provided by NSP 213 of routing engine 211 to map the data pair <VPN label, next hop> to a specific customer VPN. Firewall 208 uses both the MPLS label to be applied to the packet as well as the next hop since, for VPN traffic leaving router 200 and entering the MPLS core, the VPN labels have likely been allocated by upstream LSRs along the VPN tunnels and, as such, may be duplicative. Thus, for egress VPN traffic to be placed on the VPN, firewall 208 identifies the correct customer VPNs to which the packet is destined by indexing the mapping information provided by NSP 103 based on the unique pair: <VPN label, next hop> learned in the route lookup for the packet. Based on the customer VPN identified from the mapping, firewall 208 accesses its root configuration data as well as the configuration data for the specific virtual security system 240 to identify any zone that either root administrator 207 or the VSYS administrator 209 has defined that includes the customer VPN to which the packet is destined.

Next, having determined the input zone and the output zone for the packet, firewall 208 accesses the root configuration data and the configuration data for the specific virtual security system 240 to identify any policy that either root administrator 207 or the VSYS administrator 209 has defined for traffic traveling between those zones. At this time, firewall 208 also applies any packet flow criteria that have been defined by the policies. Upon identifying the matching policies, firewall 208 applies to the packet the actions specified by those policies (252). In this way, zone and policy selection by firewall 208 is dependent on the particular virtual security system 240 to which the packet belongs.

After applying the policies, firewall 208 processes the packet along a "first path" by initializing and creating session information to maintain state for the packet flow. Finally, firewall 208 injects the packet into forwarding component 220 for forwarding in accordance with the particular FIB 214 corresponding to the virtual security system 240 (254). In this example, router 200 integrates MPLS-aware, zone-based firewall security features in single physical network device that provides support for multiple virtual security systems. Moreover, each virtual security system can logically apply a full mesh of zone-based policies can be defined and applied seamlessly with respect to physical interfaces as well as customer VPNs.

Figure 11:
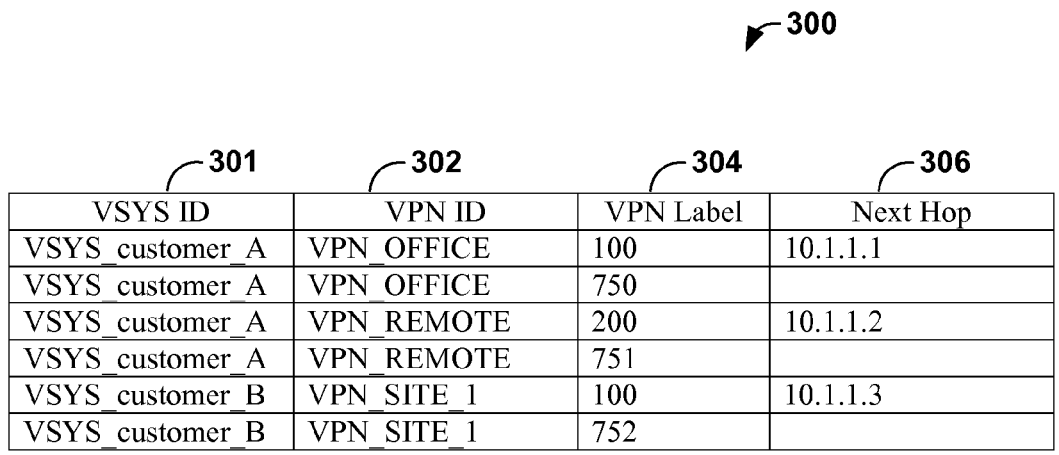
FIG. 11 illustrates example mapping information provided by a routing component to an integrated firewall of a network device enabling security services to be applied to MPLS tunnels for different virtual security systems.

FIG. 11 illustrates example mapping information 300 provided by a routing component to an integrated firewall of a network device having support for virtual security devices (e.g., from NSP 213 of routing engine 211 to firewall 208 of router 200) to enable security services to be applied to MPLS tunnels. For exemplary purposes, FIG. 11 will be described with respect to router 200 of FIG. 9.

As shown in FIG. 11, the example mapping information 300 includes a plurality of entries, each entry listing a virtual security system identifier 301 (e.g., a text string or other identifier) that was provided by root administrator 207 when defining virtual security systems 240. In addition mapping information 300 stores a customer VPN identifier 302 (e.g., a text string or other identifier) that was provided by either the root administrator 207 or the authorized VSYS administrator 209 when defining input zones and policies for the corresponding one of virtual security systems 240 via interaction with a user interface 215.

For example, the first and second entries of mapping information include a customer VPN identifier "VPN_customer_A" representing a string specified by the administrator when defining an interface for an input zone for the firewall, as shown in the examples discussed above. In response to the use of a new customer VPN identifier within the configuration data for the firewall, the routing component (e.g., NSP 73 of routing engine 211) creates two entries in mapping information 300. The first entry maps the customer VPN identifier to a VPN label to be applied by the router's forwarding component (e.g., forwarding component 220) when encapsulating IP traffic destined for that particular customer's VPN site as well as a corresponding next hop identifier for the traffic. The second entry maps that same customer VPN identifier to a VPN label that is expected to be affixed as the inner label to inbound MPLS traffic received from the customer's VPN site.

For example, the first four entries of mapping information 300 correspond to a first virtual security system (VSYS_customer_A) and the last two entries correspond to a second virtual security system (VSYS_customer_B). Thus, this example illustrates mapping information 300 for a router having two virtual security systems currently defined.

The first entry of mapping information 300 is applicable only to virtual security system "VPN_Customer_A" and maps a VPN identifier "VPN_OFFICE" to an <VPN label 100, next hop identifier 10.1.1.1> pair. In this way, the first entry resolves the "VPN_OFFICE" string utilized in the firewall configuration data by the VSYS_administrator to a specific outbound VPN tunnel recognized within the first virtual security system.

The second entry of mapping information 300 is also only applicable to virtual security system "VPN_Customer_A" and maps the VPN identifier "VPN_OFFICE" to an VPN label 750 previously allocated by the router for this virtual security system. That is, MPLS label 750 is expected to be affixed to VPM traffic received by the inbound VPN tunnel for that customer VPN site of the virtual security system VSYS_customer_A. Mapping information 300 may be input by either root administrator 207 or the authorized VSYS_administrator 209 to resolve either root firewall configuration information or VSYS-specific configuration information to specific MPLS tunnels and next hops where necessary, or the routing component may determine this information dynamically based on the corresponding RIB and FIB utilized for routing and forwarding purposes for each virtual security system. Although shown as a single table, mapping information 300 may be partitioned and separated based on virtual security system and stored in separate data structures and/or memories so as to add an additional degree of separation for the virtual security systems.

Figure 12:
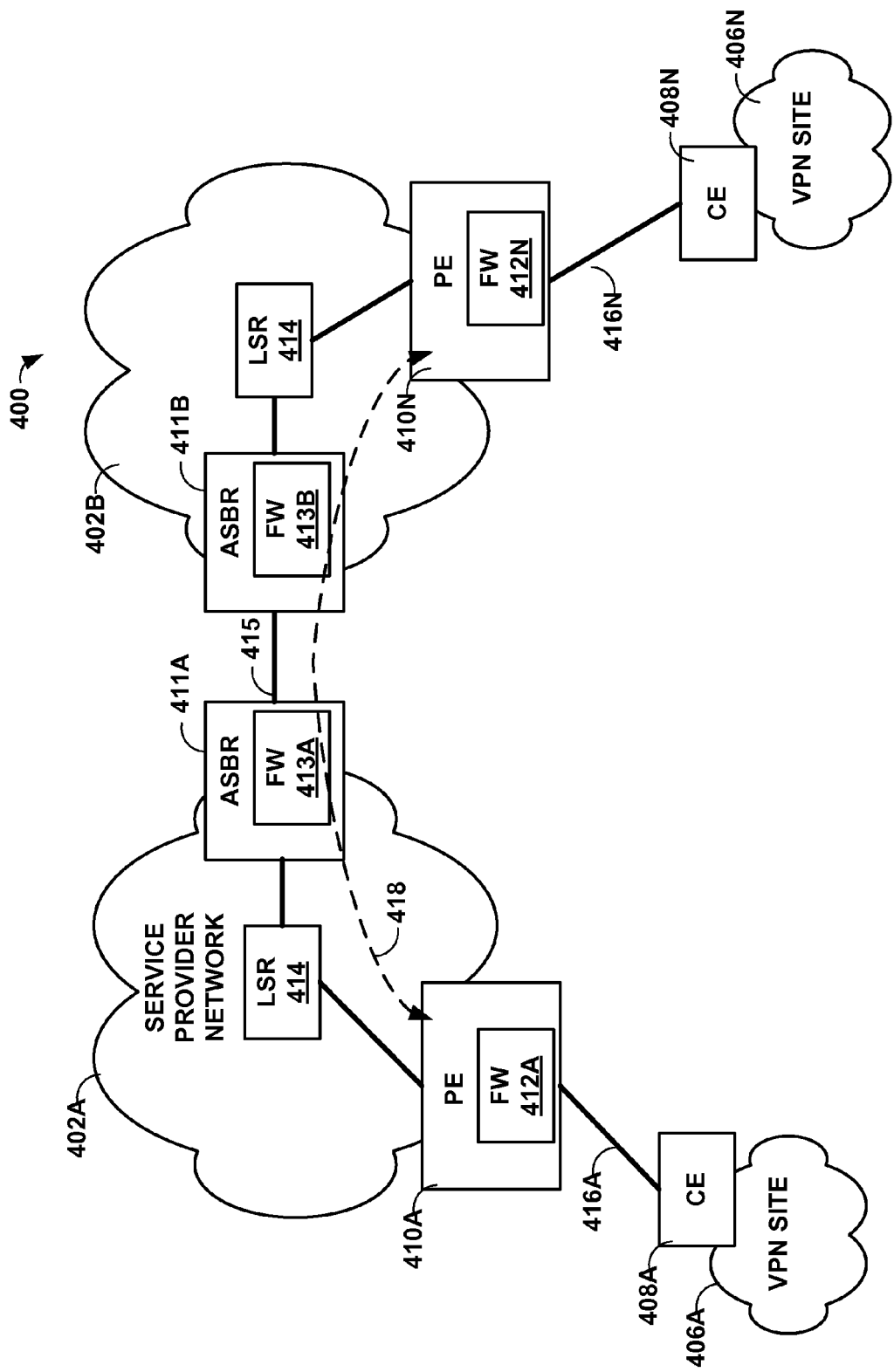
FIG. 12 is a block diagram showing an inter-provider deployment of the MPLS, aware, zone-based firewall described herein.

FIG. 12 is a block diagram illustrating an example network environment 400 in which two service provider networks 402A, 402B provide connectivity between customer virtual private network (VPN) sites 406A-406N (collectively, VPN sites 406). In the example of FIG. 12, each service provider network 402 is operated by a different service provider, and PEs 411A, 411B operate at an inter-provider boundary. In this example, autonomous system border routers (ASBRs) 411A, 411B are coupled by a physical link 415 and exchange network traffic for VPN sites 406A, 406B. Similar to FIG. 1, VPN sites 406A, 406B include customer edge (CE) routers 408A-8N connected to provider edge (PE) routers 410A-410N via network links 416A-416N.

As described with respect to the embodiments of FIG. 1, service provider networks 402A and 402B supports provider-provisioned VPNs (PPVPNs). For example, administrators associated with service provider networks 402 may configure PE routers 410 and ASBRs 411 so as to provision VPN services for one or more customer VPNs for VPN sites 406. At this time the administrators for the different service provider networks 402 separately define a VPN identifier for each customer VPN (e.g., VPN_CUSTOMER_A) traversing their respective service provider network 402, and PE routers 410 and ASBRs 411 allocate VPN labels, VPN addresses, a router target, a router distinguisher, and all other state information necessary for the VPN.

As shown in FIG. 12, each of service provider networks 402 may include additional internal label switched routers (LSRs) 414 that provide a Multi-protocol Label Switching (MPLS) MPLS core network within each service provider network 402. PE routers 410 and ASBRs 411 may communicate with LSRs 414 to establish one or more one or more label switch paths (LSPs) for transporting the VPN communications through service provider networks 404. or may be end-to-end LSPs spanning service provider networks 402 so as to originate and terminate at PE routers 412. Traffic flowing along network links 416 to and from VPN sites 406 may take the form of Internet Protocol (IP) packets, and may be secured using Internet Protocol Security (IPSec) protocols, Secure Sockets Layer (SSL) protocols or other protocols that make use of cryptographic technology.

In one example, PE routers 410 exchange VPN information, exchange VPN routes and agree on inner VPN labels via mpBGP so as to form one or more end-to-end VPN tunnels 418 for transporting communications of customer VPN sites 406 through service provider networks 402. In this embodiment, ASBRs 411 and LSRs 414 might not directly participate in the mpBGP negotiation or VPN label assignment, but may utilize LDP or RSVP to allocate outer MPLS labels to be applied to the VPN communications for traversing service provider networks 402. In this example, PE routers 410 provide ingress and egress for the IP traffic with respect to the MPLS services and VPNs provided within service provider networks 404. That is, PE routers 10 operate as ingress and egress routers for communicating the IP packets of VPN sites 6 as encapsulated VPN packets traversing VPN tunnels 418. For example, PE router 410A may receive IP traffic from VPN site 406A, and may then prepend a VPN label based on the corresponding customer VPN associated with the traffic. The VPN traffic may then be viewed as flowing along a VPN tunnel 418 through service provider networks 402. One or more of these VPN tunnels (i.e., packet flows having VPN labels prepended to each packet) may then further be encapsulated within a label stack of additional MPLS labels allocated by LSRs 414 and ASBRs 411.

In another example embodiment, ASBRs 411 communicate to form an LSP between the two ASBRs, as opposed to an end-to-end VPN tunnel 418, so as to convey VPN communications between service provider networks. In this example, ASBRs 411 may utilize mpBGP to agree on inner VPN labels and outer MPLS labels to be assigned to the packets.

In either case, similar to FIG. 1, each of PE routers 410 includes an integrated firewall (FW) 412A-412N (collectively, FWs 412) that is an MPLS-aware firewall that allows service provider networks 402 to apply firewall security policies at the IP-MPLS interface between the service provider networks and the customer VPN sites 406. Further, each of PE routers 411 located at the inter-provider boundary between service provider networks 402 includes an integrated firewall (FW) 413A, 413B that is an MPLS-aware firewall that allows service provider networks 404 to apply firewall security policies at the interface between the service provider networks. In one example, FWs 413 allow firewall security policies to be applied at the point where VPN traffic is communicated between service provider networks on link 415 via VPN tunnels 418. Moreover, by applying the techniques discussed above, administrators may define different firewall zones and different security policies to be applied to VPN traffic for different VPNs even though that VPN traffic is flowing through the same physical link 415. For example, in accordance with the techniques described herein, FWs 413 may be zone-based firewalls that allow firewall zones and security policies to be specified in reference to the customer VPNs provisioned by the service provider network in accordance with either of the examples set forth above. Moreover, FWs 413 allow such techniques to be applied at an MPLS-MPLS interface typically found at an inter-provider boundary. That is, packets exchanged at the inter-provider boundary between service provider networks 4 packets are typically in the form of VPN packets having inner VPN labels and optionally additional outer MPLS labels.

When defining zone-based security services for the inter-provider boundary, administrators may configure FWs 413 by specifying both input zones and output zones having interface lists that include identifiers for customer VPNs. That is, similar to the techniques described above with respect to FIGS. 1-11, each of PE routers 411 may provide a user interface having a command syntax that allows individual customer VPNs to be defined and recognized by FWs 12 as logical interfaces, and these logical interfaces can be used like other physical interfaces of the PE routers to define zones and corresponding security polices to be applied to those zones. As described above, these identifiers for the customer VPN are mapped to VPN labels to be applied on either side of FWs 413 (i.e., either to traverse link 415 or when internally communted to the MPLS core of the service provider network). Alternatively or in addition, system administrators may define a single firewall zone with respect to physical link 415 so as to be able to define common security policies to be applied to all traffic traversing the inter-provider boundary.

As illustrated in FIG. 12, the MPLS-aware FWs 413 may be integrated within routing device (e.g., PE routers 411), thus allowing a single device to be deployed by each service provider network 404 at the inter-provider boundary to provide both routing functionality, including MPLS and VPN support, as well as firewall services. FW 413 may implement any of the functions describes above with respect to FIGS. 1-11 including the user command syntax of the user interface and support for virtual security systems.

Although described with respect to provider edge routers, the techniques described herein may be applied to other types of routers and network devices generally. For example, the router may be an edge device, peering device, or core device of a Service Provider (SP) network. As additional examples, the router may be an edge router that provides broadband access, such as a Broadband Remote Access Server (BRAS) or a Broadband Network Gateway (BNG) or a Cable Modem Termination System (CMTS). As another example, the router may be an edge router that provides enterprise connectivity to public networks, such a Multi-Service Edge router (MSE). As another example, the router may be an edge router that provides mobile access, such as a Gateway GPRS (General Packet Radio Services) Support Node (GGSN), a Packet Data Serving Node (PDSN), or a Public Data Network Gateway (PDN-GW) As a further example, the router may be a data center device (e.g., and edge router) that provides routing and security functions for packets flowing in or out of a data center. As another example, the router may be a peering router that serves as a point of interconnection between network service providers. As yet another example, the router may be an aggregation router or core router within an IP network core of a service provider, such as a core router positioned between GGSNs or PDSNs or BNGs. In addition, the router may be a device associated with a private enterprise network.

Further, the techniques may be applied to any network device that implements layer three functionality in the control plane so as to be aware of the MPLS signaling utilized by a network when establishing MPLS VPNs. In this manner, the network device may incorporate any of the functions described herein so as to provide an MPLS-aware firewall, such as a zone-based firewall in which MPLS VPNs and other interfaces of the device may be seamlessly specified by the administrator when defining zones and zone-based policies for the firewall services provided by the device.

Various embodiments of the invention have been described. These and other embodiments are within the scope of the following claims.

The invention claimed is:
1. A network router comprising:
a plurality of interfaces configured to send and receive packets for customer virtual private networks (VPNs), wherein the plurality of interfaces includes an interface to connect to a service provider network and one or more interfaces to connect to one or more customer networks;

a firewall integrated within the network router, the firewall configured to apply stateful firewall services to the packets;

a routing engine comprising a control unit that executes a routing protocol to maintain routing information specifying routes through a network, wherein the control unit executes at least one multi-protocol label switched (MPLS) protocol to establish a plurality of MPLS label switched paths (LSPs) through the service provider network to carry the packets for the customer VPNs;

a forwarding engine configured by the routing engine to select next hops for the packets in accordance with the routing information, the forwarding engine comprising a switch fabric to forward the packets to the interfaces based on the selected next hops, wherein the forwarding engine includes a flow control module that, upon receiving packets from the network, directs one or more of the packets to the firewall for application of the stateful firewall services; and a user interface by which a user specifies one or more zones to be recognized by the firewall when applying the stateful firewall services to the packets, each of the zones defined by a list of one or more of the interfaces, wherein the user interface supports a syntax that allows the user to define the zones by specifying the customer VPNs within lists of interfaces associated with the zones, and wherein the user interface allows the user to specify one or more policies for the firewall with respect to the zones, wherein the control unit of the routing engine executes a network services protocol that programs the firewall with mapping information that specifies one or more MPLS labels for each of the MPLS LSPs and that maps the MPLS labels to the customer VPNs specified by the user interface, wherein the firewall applies the policies to the packets received from the service provider network having MPLS labels that match the MPLS labels specified within the mapping information programmed into the firewall by the network services protocol of the routing engine, and wherein the firewall applies the policies to the packets received from the customer networks that are destined to be forwarded by the routing device to the MPLS LSPs as MPLS packets.

2. The network router of claim 1, wherein the firewall stores configuration data that specifies the zones defined by the user, at least one of the zones specifying a collection of interfaces associated with the identifiers for one or more of the customer VPNs.

3. The network router of claim 1, wherein for the MPLS LSPs for which the network router operates as an egress label switched router, the mapping information between the routing engine and the firewall associates inner MPLS labels affixed to packets received from the LSPs by the interface cards with respective ones of the identifiers for the customer VPNs.

4. The network router of claim 1, wherein for the MPLS LSPs for which the network router operates as an ingress label switched router, the mapping information communicated between the routing engine and the firewall associates pairs of MPLS labels and a forwarding next hop with respective ones of the identifiers for the customer VPNs, wherein the MPLS labels are MPLS labels to be subsequently affixed to the packets when output to the network by the forwarding engine.

5. The network router of claim 1,
wherein the firewall determines an input zone and an output zone for each of the packets based on the zones defined by the user,
wherein the firewall applies one or more of the stateful firewall services to each of the packets based on the input zone and output zone determined for the packet, and
wherein at least one of the input zone or output zone is defined by the user by specifying at least one of the customer VPNs within a collection of interfaces associated with the input zone or output zone.

6. The network router of claim 1,
wherein, based on the routing information, the routing engine programs the forwarding engine with forwarding information that associates network destinations and MPLS labels with specific next hops and corresponding interface ports of interface cards of the router,
wherein the routing engine programs the firewall with at least a portion of the forwarding information, and
wherein, for each packet received from the forwarding engine, the firewall performs a route lookup for the packet using the portion of the forwarding information to determine an output zone for the packet.

7. The network router of claim 1, wherein the user interface is a text-based interface that supports a command syntax that allows the user to specify the zones.

8. The network router of claim 1, wherein the user interface is a user interface output by the router to be presented remotely by a web browsers or management station.

9. The network router of claim 1, wherein the stateful firewall services include multiple services including, intrusion deep packet inspection, virus scanning of application-layer data carried by the packets, layer seven security services.

10. The network router of claim 1, wherein the network router comprises one of a provider edge router, a Broadband Remote Access Server (BRAS), a Broadband Network Gateway (BNG), Cable Modem Termination System (CMTS), a Multi-Service Edge router (MSE), a Gateway GPRS (General Packet Radio Services) Support Node (GGSN), a Packet Data Serving Node (PDSN), or a Public Data Network Gateway (PDN-GW), a data center device that provides routing and security functions for packets flowing in or out of a data center, a peering router that serves as a point of interconnection between network service providers, or an autonomous system border router (ASBR).

11. The network router of claim 1, where the lists of interfaces are lists of logical interfaces, and wherein at least two or more or of the MPLS LSPs for the customer VPNs flow through a single physical interface of the router.

12. The network router of claim 1, wherein the MPLS protocol executing within the routing engine learns the MPLS labels from one or more peer routers, and wherein the network services protocol generates the mapping information to maps the MPLS labels learned from the peer routers via the MPLS protocol to the customer VPNs specified by the user via the user interface.

13. A method comprising:
executing, with a routing engine of a router, at least one multi-protocol label switched (MPLS) protocol to establish MPLS label switched paths (LSPs) through the service provider network to carry packets for one or more customer virtual private networks (VPNs) for one or more customer networks;
presenting, with the router, a user interface by which a user specifies one or more zones to be recognized by a firewall integrated within the router, wherein the user interface supports a syntax that allows the user to define the zones by specifying one or more the customer VPNs as interfaces associated with the zones, and wherein the user interface allows the user to specify one or more policies for the firewall with respect to the zones;

communicating mapping information from the routing engine to the firewall, wherein the mapping information associates one or more MPLS labels for the MPLS LSPs with the customer VPNs specified by the user interface;

receiving, from a network, packets at a plurality of interfaces of the router, wherein the plurality of interfaces includes an interface to connect to the service provider network and one or more interfaces to connect to the one or more customer networks;

directing, with a flow control module of a forwarding engine of the router, one or more of the received packets to the firewall for application of stateful firewall services;

applying stateful firewall services to the packets with the firewall of the network router based on the zones specified by the user and the mapping information received from the routing engine, wherein applying stateful firewall services comprises applying the policies to the packets received from the service provider network having MPLS labels that match the MPLS labels specified within the mapping information and to packets received from the customer networks that are destined to be forwarded by the routing device as MPLS packets;

after applying stateful firewall services, forwarding at least some of the packets from the firewall to the forwarding engine;

selecting, for the packets from the firewall, next hops within the network with the forwarding engine; and forwarding the packets to the interfaces in accordance with the selected next hops.

14. The method of claim 13, where the lists of interfaces are lists of logical interfaces, and wherein at least two or more or of the MPLS LSPs for the customer VPNs flow through a single physical interface of the router.

15. The method of claim 13, further comprising storing within the router configuration data that specifies the zones defined by the user, at least one of the zones specifying a collection of interfaces that includes identifiers for one or more of the customer VPNs.

16. The method of claim 13, wherein for the MPLS LSPs for which the network router operates as an egress label switched router, the mapping information associates inner MPLS labels affixed to packets received from the LSPs by the interface cards with respective ones of the identifiers for the customer VPNs.

17. The method of claim 13, wherein for MPLS LSPs for which the network router operates as an ingress label switched router, the mapping information associates pairs of a MPLS labels and a forwarding next hop with respective ones of the identifiers for the customer VPNs, wherein the MPLS labels are to be subsequently affixed to the packets when output to the network by the forwarding engine.

18. The method of claim 13,
wherein the user interface allows the user to specify one or more policies for the firewall,
wherein the firewall applies the policies to the packets received from the service provider network having MPLS labels that match the MPLS labels specified within the mapping information communicated to the firewall by the routing engine, and
wherein the firewall applies the policies to packets received from the customer networks and that are destined to be forwarded by the routing device as MPLS packets.

19. The method of claim 13, further comprising
storing, within the router, configuration data that specifies the zones defined by the user, at least one of the zones specifying a collection of interfaces that includes identifiers for one or more customer VPNs;
determining, for each of the received packets, whether the received packet is an MPLS packet;
when the received packet is an MPLS packet, accessing the mapping information to map an inner MPLS label of received packet to one of the identifiers for customer VPNs to determine an input zone for the received packet;
determining an output zone for the packet; and
applying one or more of the stateful firewall services to each of the packets based on the input zone and output zone determined for the packet.

20. The method of claim 13, further comprising
storing, within the router, configuration data that specifies the zones defined by the user, at least one of the zones specifying a collection of interfaces that includes identifiers for one or more of the customer VPNs;
determining, for each of the received packets, an input zone for the received packet;
performing a route lookup with the firewall to determine whether the received packet is to be output on an MPLS LSP by the forwarding engine;
when the received packet is to be output on the VPN tunnel:
(1) determining from the route lookup a next hop for the packet and an MPLS label that the forwarding engine will affix to the packet when forwarding the packet; and
(2) accessing the mapping information to map the next hop and the MPLS label to be affixed to the packet to one of the customer VPNs to determine an output zone for the received packet when the packet is subsequently forwarded by the forwarding engine; and
applying one or more of the stateful firewall services to each of the packets based on the input zone and output zone determined for the packet.

21. The method of claim 13, wherein the user interface is one of a graphics-based interface or a text-based interface that supports a command syntax that allows the user to specify the zone.

* * * * *